(12) United States Patent
McConnell

(10) Patent No.: US 10,785,958 B2
(45) Date of Patent: Sep. 29, 2020

(54) HANDLE ASSEMBLY FOR LEASH SYSTEM

(71) Applicant: Peter McConnell, San Diego, CA (US)

(72) Inventor: Peter McConnell, San Diego, CA (US)

(73) Assignee: Peter McConnell, San Diego, CA (US)

( * ) Notice: Subject to any disclaimer, the term of this patent is extended or adjusted under 35 U.S.C. 154(b) by 45 days.

(21) Appl. No.: 16/100,821

(22) Filed: Aug. 10, 2018

(65) Prior Publication Data

US 2018/0343834 A1   Dec. 6, 2018

Related U.S. Application Data

(63) Continuation-in-part of application No. 15/974,110, filed on May 8, 2018.

(60) Provisional application No. 62/507,031, filed on May 16, 2017.

(51) Int. Cl.
*A01K 27/00* (2006.01)
*A01K 1/04* (2006.01)

(52) U.S. Cl.
CPC .............. *A01K 27/004* (2013.01); *A01K 1/04* (2013.01); *A01K 27/003* (2013.01); *A01K 27/005* (2013.01)

(58) Field of Classification Search
CPC .... F16G 11/105; F16G 11/106; F16G 11/103; F16G 11/00; F16G 11/101; Y10T 16/4724; Y10T 24/3936; Y10T 24/3644; Y10T 24/3956; Y10T 24/3969; Y10T 24/3996; Y10T 24/4072; Y10T 24/4079; A44B 11/12
See application file for complete search history.

(56) References Cited

U.S. PATENT DOCUMENTS

| | | | | |
|---|---|---|---|---|
| 4,878,270 A | * | 11/1989 | Westerkamp | ........... F16G 11/04 24/132 R |
| 8,881,349 B2 | * | 11/2014 | Mulholland | .......... F16G 11/106 24/265 H |

* cited by examiner

*Primary Examiner* — Robert Sandy
(74) *Attorney, Agent, or Firm* — Roeder & Broder LLP; James P. Broder

(57) ABSTRACT

A handle assembly for a leash system includes an outer housing that defines a handle interior and an inner housing that is positioned within the handle interior. The leash system includes a tether. The outer housing can be substantially spherical. The inner housing selectively moves between unlocked and locked positions. When in the locked position, the inner housing inhibits movement of the tether relative to the handle assembly in a first direction but not in a second direction that is substantially opposite the first direction. The inner housing can be biased towards one of the unlocked and the locked position. The inner housing includes a tether engager that selectively engages the tether. The handle assembly includes an inner housing mover that is connected to the inner housing so that the inner housing mover moves the inner housing between the unlocked and the locked position.

20 Claims, 13 Drawing Sheets

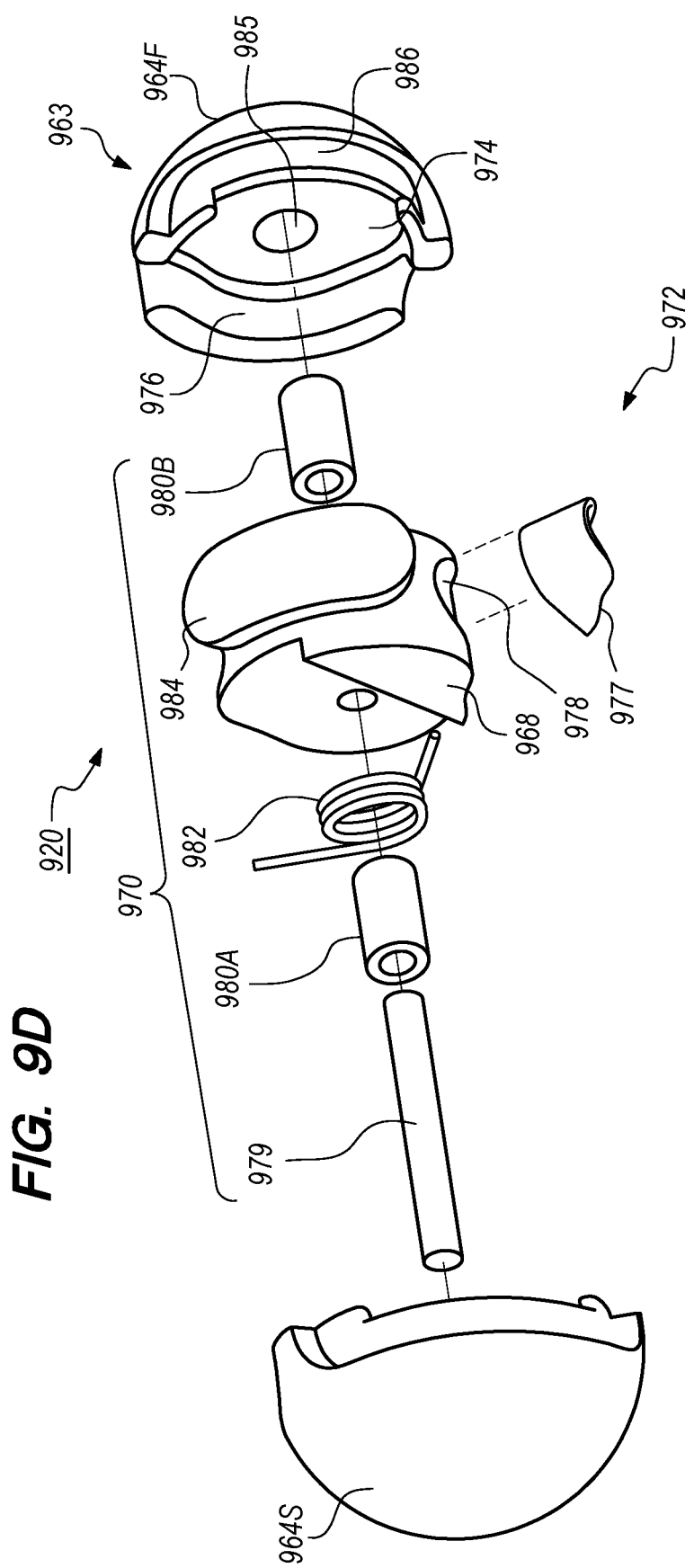

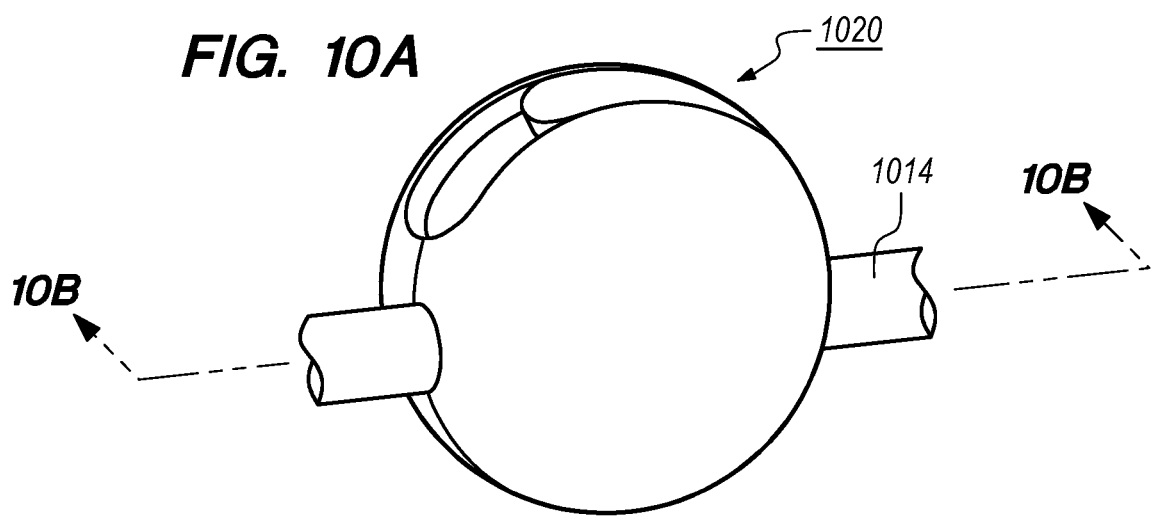
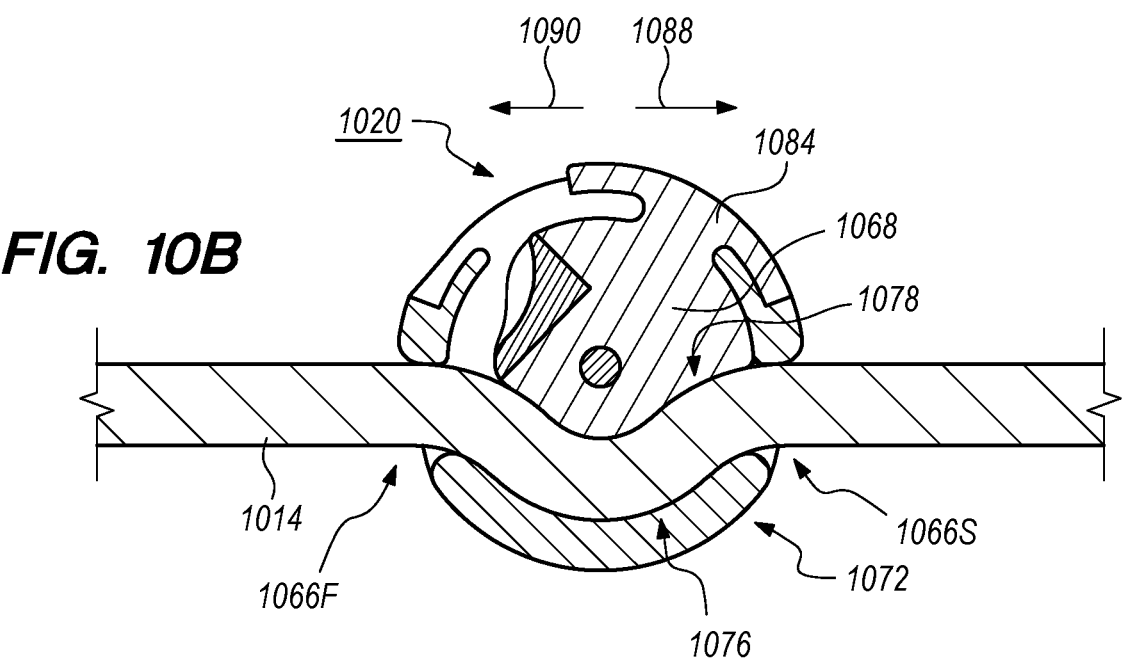

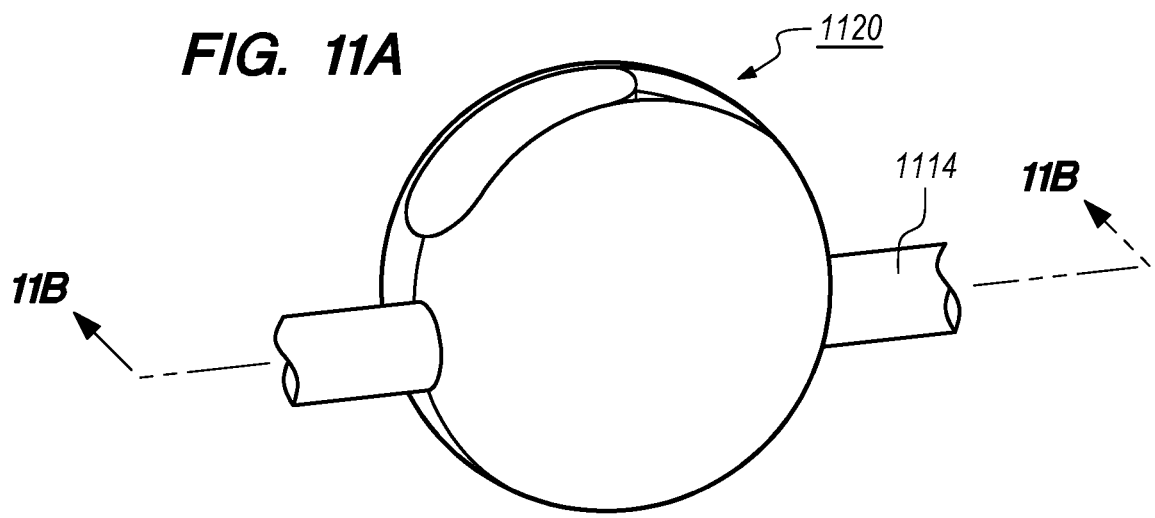
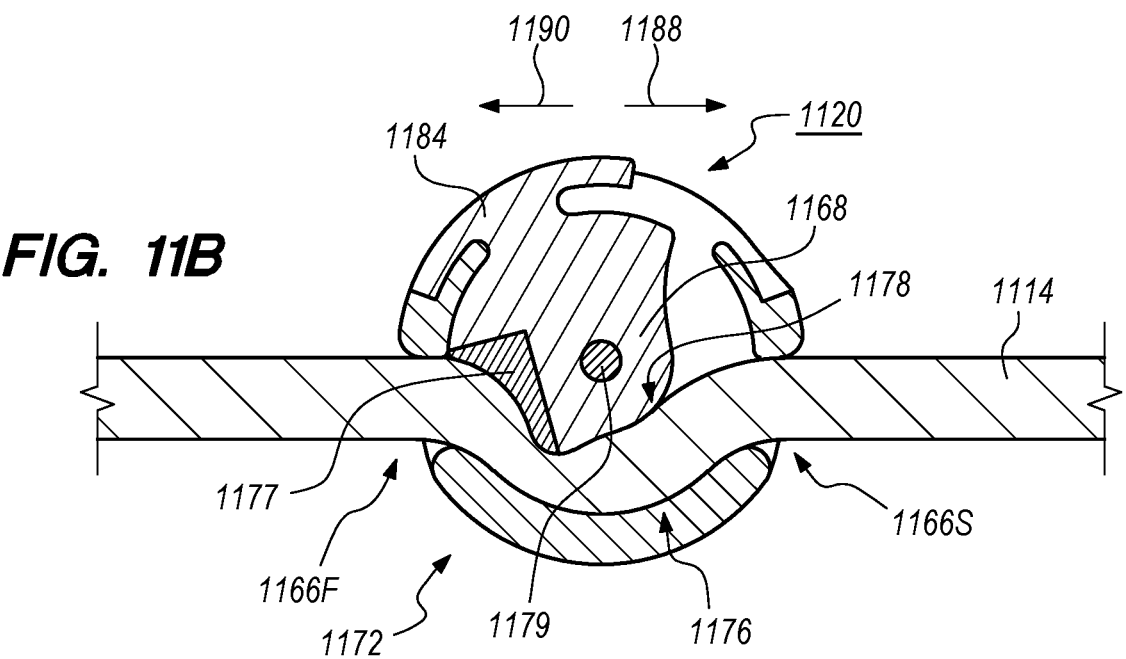

HANDLE ASSEMBLY FOR LEASH SYSTEM

RELATED APPLICATIONS

The present application is a continuation-in-part application claiming the benefit under 35 U.S.C. 120 on co-pending U.S. patent application Ser. No. 15/974,110, filed on May 8, 2018, and entitled "CONNECTOR ASSEMBLY FOR LEASH SYSTEM", which claims priority on U.S. Provisional Application Ser. No. 62/507,031, filed on May 16, 2017, and entitled "MODULAR ANIMAL LEASH". As far as permitted, the contents of U.S. patent application Ser. No. 15/974,110 and U.S. Provisional Application Ser. No. 62/507,031 are incorporated herein by reference.

BACKGROUND

Pet leashes, such as for dogs, share a common function—to keep a dog safe and under control in outdoor and public places. However, each pet is different, and temperament and training needs often determine which type of leash system is best for each pet.

In order to accommodate the varying sizes, temperaments or behaviors of pets, leashes have been designed having fixed lengths, variable lengths, or in combination. The length of the leash is one important aspect of the leash. Leashes that are too long do not provide sufficient control of the pet which can result in undesirable accidents, whereas leashes that are too short can be uncomfortable for both the pet and the user.

The standard leash generally has a fixed length and a fixed loop at one end to serve as a handle. The fixed length of the standard leash can often result in a leash which is loose, not taut, between the end attached to the dog and the opposite end held by the user, attached to fixed objects, such as trees or poles, or attached to other moveable objects. Similarly, the fixed loop can make it difficult to attach to fixed or moveable objects of varying shapes or sizes resulting in a loose leash or loose attachment. The loose leash or attachment can cause the standard leash to fall to the ground when attached to fixed objects, which may allow the dog to urinate on the standard leash. Further, the standard leash can be susceptible to getting tangled around the dog, the user or the fixed or moveable object. Another disadvantage of the standard leash is that when attached to fixed or moveable objects the standard leash generally must be tied in a knot which can contribute to the breakdown of the leash or make it more difficult to attach or untie.

Retractable leashes can be convenient for both the pet and the user. However, while the retractable leash allows for variable lengths, it can only provide limited control. Specifically, it is difficult to keep larger or particularly energetic or stronger pets under control. Retractable leashes can also allow the pet to accelerate to a significant speed before being stopped suddenly, which can present the possibility of injury to both the pet and the user. Furthermore, retractable leashes can be difficult to attach to fixed or moveable objects or may not be able to attach to fixed or movable objects, such as user, altogether.

Additionally, both standard and retractable leashes can be difficult to hold and can cause finger and hand fatigue for users of larger or particularly energetic or stronger pets or those that walk their pet for a prolonged period of time. For example, standard leashes often include the fixed loop that serves as a handle, which can cut into or burn the user's hand when the pet pulls. Retractable leashes often include relatively large and bulky handles in order to house retractable components. Accordingly, the user that utilizes standard and/or retractable leashes can have difficulty keeping the leashes in their hand depending on the activity or behavior of the pet. Furthermore, larger or particularly energetic or stronger pets can be difficult to control during leash-constrained activities in that the pet may run in front of, behind, or side to side the user, and often with great force in an effort to break free of the leash. This action by the pet, in addition to the handle design, can be challenging both to the user and to the pet. Specifically, the user may have difficulty holding onto the fixed loop or handle of standard and/or retractable leashes or simply grow weary in doing so.

As a result, standard and/or retractable leashes do not adequately account for the varying temperaments and behaviors of pets, or the varying lifestyle of their owners or users. More specifically, standard and/or retractable leashes can limit or inhibit the ability of the user to make adjustments during diverse leash-constrained activities depending on the behavior of the pet.

SUMMARY

The present invention is directed toward a handle assembly for a leash system. In certain embodiments, the leash system includes a tether. In various embodiments, the handle assembly can include an outer housing and an inner housing. The outer housing defines a handle interior. The inner housing is positioned within the handle interior. In certain embodiments, the inner housing can selectively move between an unlocked position and a locked position. The inner housing can inhibit movement of the tether relative to the handle assembly in a first direction when in the locked position. The inner housing does not inhibit movement of the tether relative to the handle assembly in a second direction that is substantially opposite the first direction.

In certain embodiments, the handle assembly can further include an inner housing mover that is connected to the inner housing. In some embodiments, the inner housing mover can selectively move the inner housing between the unlocked position and the locked position. In certain embodiments, the inner housing mover can include one of a slidable element, a switch, a lever or a button.

In some embodiments, the outer housing can be substantially spherical. Additionally, in certain embodiments, the outer housing can include a first outer housing member and an opposed second outer housing member that is connected to the first outer housing member. In such embodiments, the first outer housing member and the second outer housing member can be substantially mirror images of one another.

In other embodiments, the outer housing can include an outer housing tether receiver that receives the tether. In such embodiments, the outer housing tether receiver is positioned within the handle interior. In one embodiment, the outer housing tether receiver can be configured to position the tether within the handle interior in a substantially curved configuration. In another embodiment, the outer housing tether receiver can be configured to guide the tether within the handle interior in a substantially linear configuration.

In certain embodiments, the inner housing can include a tether engager. The tether engager can selectively engage the tether. The tether engager can be formed from a resilient material. In various embodiments, the inner housing can be biased towards one of the unlocked position and the locked position.

In one embodiment, the handle assembly can further include an inner housing pivot. In this embodiment, the inner housing can rotate about the inner housing pivot.

Additionally, in various embodiments, the handle assembly can be substantially cylindrical.

The present invention is further directed toward a method for selectively inhibiting movement of a tether relative to a handle assembly in a first direction. In certain embodiments, the method can include the steps of defining a handle interior with an outer housing and positioning an inner housing within the handle interior. In some embodiments, the inner housing can selectively move between an unlocked position and a locked position. The inner housing can inhibit movement of the tether relative to the handle assembly in the first direction when in the locked position. The inner housing does not inhibit movement of the tether relative to the handle assembly in a second direction that is substantially opposite the first direction.

In various embodiments, the method can further include the step of manipulating an inner housing mover to selectively move the inner housing between the unlocked position and the locked position. The step of manipulating can include selectively moving the inner housing mover in the first direction that moves the inner housing to the unlocked position. Additionally, the step of manipulating can include selectively moving the inner housing mover in a second direction that moves the inner housing to the locked position.

In some embodiments, the method can further include the step of biasing the inner housing in one of the first direction and the second direction.

In certain applications, the present invention is further directed toward a handle assembly for a leash system. In certain embodiments, the leash system includes a tether. In various embodiments, the handle assembly can include an outer housing that defines a handle interior, an inner housing and an inner housing mover.

The inner housing is positioned within the handle interior. In certain embodiments, the inner housing can selectively move between an unlocked position and a locked position. Additionally, the inner housing can be biased in the locked position.

The inner housing mover is connected to the inner housing. In some embodiments, the inner housing mover can selectively move in a first direction that moves the inner housing to the unlocked position. The inner housing mover can also selectively move in a second direction that is substantially opposite the first direction. The second direction moves the inner housing to the locked position. In various embodiments, the inner housing can inhibit movement of the tether relative to the handle assembly in the first direction when in the locked position. The inner housing does not inhibit movement of the tether relative to the handle assembly in the second direction.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 9D is an exploded view of the embodiment of the handle assembly illustrated in FIG. 9A;

FIG. 10A is a perspective view of another embodiment of the handle assembly, shown in an unlocked position;

FIG. 10B is a cross-sectional view of the handle assembly taken on line 10B-10B in FIG. 10A;

FIG. 11A is a perspective view of still another embodiment of the handle assembly, shown in a locked position;

FIG. 11B is a cross-sectional view of the handle assembly taken on line 11B-11B in FIG. 11A;

DESCRIPTION

Embodiments of the present invention are described herein in the context of a leash system. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
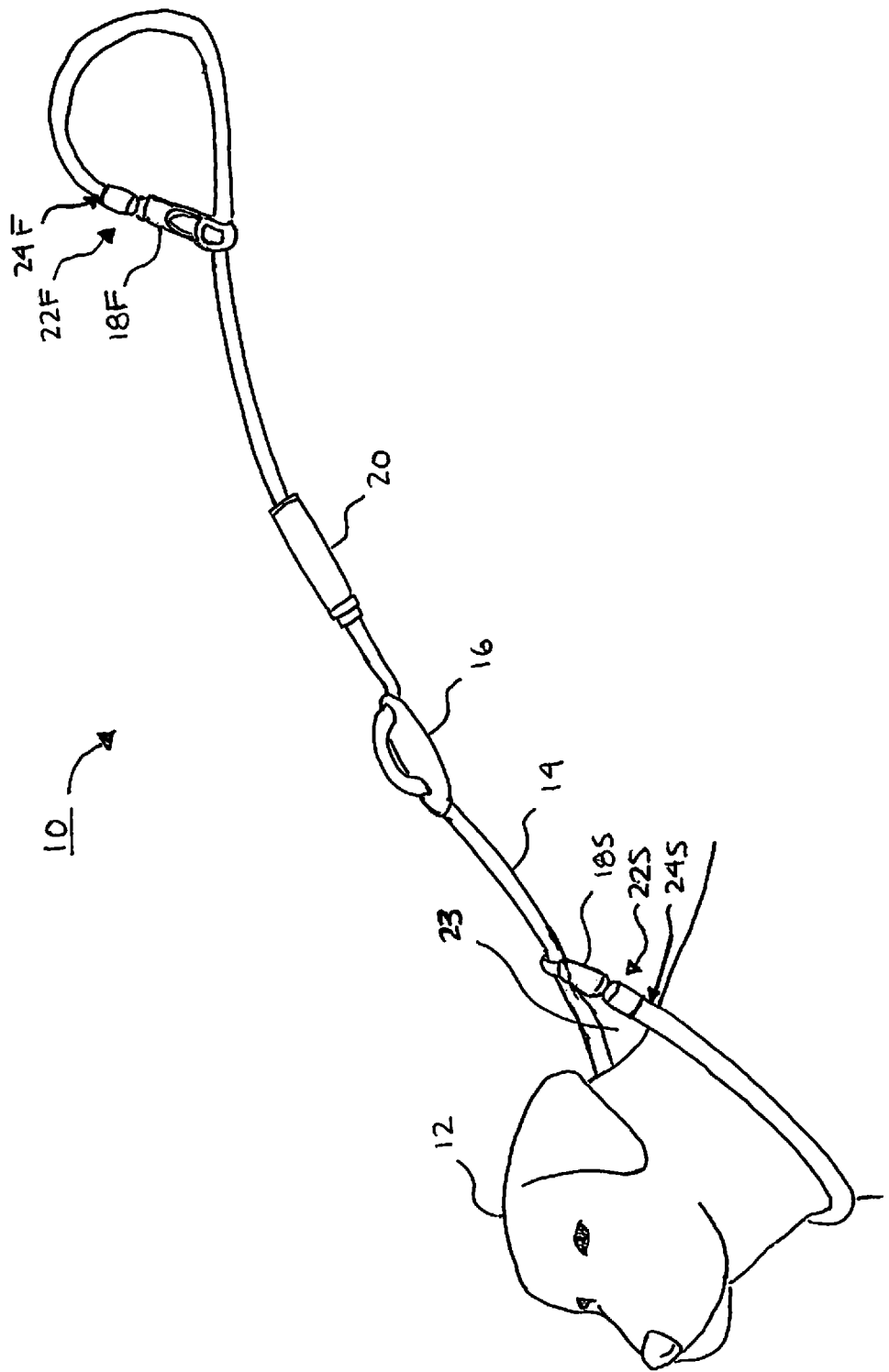
FIG. 1 is a perspective view of a pet and one embodiment of a leash system having features of the present invention.

FIG. 1 is a perspective view of one embodiment of a leash system 10 for use with a dog 12. Although the leash system 10 is specifically described herein with respect to use with dogs 12, it is understood that the leash system 10 can be used with any other animal that may use a leash. It is further understood and appreciated that the leash system 10 and/or its separate structures or components can be used collectively and/or individually in conjunction with other suitable applications which can equally benefit by the teachings provided herein. Thus, the specific reference herein to the leash system 10 for use with dogs 12 is not intended to be limiting in any manner.

The design and/or configuration of the leash system 10 can be varied. In certain embodiments, such as the embodiment illustrated in FIG. 1, the leash system 10 can include a tether 14, a harness attachment 16, one or more latch assemblies 18F, 18S, a handle assembly 20 and one or more connector assemblies 22F, 22S. It is understood that although FIG. 1 illustrates the structures of the leash system 10 in a particular position, sequence and/or order, these structures can be located in any other suitable position, sequence and/or order than that illustrated in FIG. 1. It is also understood that the leash system 10 can include fewer or additional components than those specifically illustrated and described herein.

In various embodiments, the tether 14 can be configured to encircle and/or otherwise be positioned on at least a portion of the dog 12. The tether 14 can also be configured to be coupled and/or connected to various structures or components of the leash system 10. In some embodiments, the tether 14 may also be used in conjunction with the various structures or components of the leash system 10 to form a loop 23 that surrounds at least a portion of the dog 12. Alternatively, the loop 23 may be utilized to encircle or otherwise be positioned on other suitable fixed or movable objects, such as a waist or other body parts of the user, or around poles, trees, etc., or to create a handle.

The tether 14 can vary to suit the design requirements of the leash system 10. As non-exclusive examples, the tether 14 can include a rope, a cord, a cable or a chain. Alternatively, the tether 14 can include any other suitable type or style. In addition, the tether 14 may be formed from any suitable synthetic or natural material, such as nylon, rubber, cotton, leather, metal, etc., which may be in a solid or a braided form. The resistance of the tether 14 can also vary. For example, in some embodiments, the tether 14 can be flexible, resilient and/or elastic. In other embodiments, the tether 14 can be inflexible and/or rigid. Additionally, and/or alternatively, the tether 14 can include a diameter, a length and/or a width that is variable.

In the embodiment illustrated in FIG. 1, the tether 14 can include a first tether end 24F and a second tether end 24S. It is recognized that the terms "first tether end 24F" and "second tether end 24S" can be used interchangeably. The first tether end 24F and the second tether end 24S can include the tip or end of the tether 14.

The harness attachment 16 is configured to allow the tether 14 to encircle and/or tighten around a snout or muzzle of the dog 12. With this configuration, the harness attachment 16 can allow the tether 14 to form a snout harness (not shown) by encircling and/or tightening around the snout or muzzle of the dog 12, while still allowing the user sufficient control to restrain the dog 12 with the tether 14. The design of the harness attachment 16 can vary. For example, the harness attachment 16 can be of any suitable shape or design. Additionally, the harness attachment 16 can be made from any suitable material, such as a plastic or a metal, as non-exclusive examples.

In the embodiment in FIG. 1, the leash system 10 includes a first latch assembly 18F and a second latch assembly 18S. However, it is understood that the leash system 10 can include any number of latch assemblies 18F, 18S, i.e., one latch assembly, two latch assemblies, etc. It is also understood that the terms "first latch assembly 18F" is interchangeable with "second latch assembly 18S." The latch assemblies 18F, 18S, can be configured to latch or clasp to the tether 14, other suitable structures or components of the leash system 10 and/or any other suitable accessory, such as a ring of a dog collar (not shown), a harness (not shown), a pinch collar (not shown), or a halter (not shown), as non-exclusive examples.

The design of the latch assemblies 18F, 18S, can be varied to suit the design requirements of the leash system 10. In the embodiment illustrated in FIG. 1, the first latch assembly 18F is coupled to the tether 14 at the first tether end 24F via a first connector assembly 22F and the second latch assembly 18S is coupled to the tether 14 at the second tether end 24S via a second connector assembly 22S. In other embodiments, the latch assemblies 18F, 18S, can be connected directly to the tether 14. The latch assemblies 18F, 18S, can be coupled and/or connected to the tether 14 via any suitable manner or method.

The handle assembly 20 is configured to move along the tether 14. Accordingly, the handle assembly 20 may be configured to be coupled to, connected to and/or engaged with the tether 14 in order to interact with, hold to or grip the tether 14 and allow the user to sufficiently control movement of the dog 12. The design of the handle assembly 20 can vary. As one non-exclusive example, the embodiment illustrated in FIG. 1 shows the handle assembly 20 that is somewhat spherical. As referred to herein, "somewhat spherical" can include any suitable rounded or curved configuration. As an alternative example, the handle assembly 20 can be somewhat cylindrical, or have any other suitable configuration or geometry.

With these designs, the handle assembly 20 can be configured to allow the tether 14 to pass through an interior (not shown) of the handle assembly 20, with the handle assembly 20 encircling and/or engaging at least a portion of the tether 14. The manner or method in which the handle assembly 20 engages the tether 14 can vary. Furthermore, the handle assembly 20 can be configured to slide or move on the tether 14 to various locations between the first tether end 24F and the second tether end 24S. The handle assembly 20 can also be configured to engage, i.e., hold, fasten, clinch, secure, grip or lock on to, the tether 14 at various locations between the first tether end 24F and the second tether end 24S. In other embodiments, the handle assembly 20 can be configured to be alternately coupled or connected to the tether ends 24F, 24S. The specific components of the handle assembly 20 will be described in greater detail herein in relation to the embodiments illustrated in the Figures (e.g., FIGS. 9A-12B). It should be appreciated that the drawings included herewith may not necessarily be drawn to scale. Additionally, it is further appreciated that the drawings may not precisely represent the structures or components of the leash system 10 and/or handle assembly 20, but are included for purposes of clarity in demonstrating certain features and limitations of the leash system 10 and/or handle assembly 20.

In the embodiment in FIG. 1, the leash system 10 includes a first connector assembly 22F and a second connector assembly 22S. However, it is understood that the leash system 10 can include any number of connector assemblies 22F, 22S, i.e., one connector assembly, two connector assemblies, etc. It is also understood that the terms "first connector assembly 22F" is interchangeable with "second connector assembly 22S." The connector assemblies 22F, 22S, can be configured to allow a variety of customizable leash attachments, accessories and/or structures or components of the leash system 10, which may include the latch assemblies 18F, 18S, or the handle assembly 20, to be coupled and/or connected to the leash system 10.

The design of the connector assemblies 22F, 22S, can be varied to suit the design requirements of the leash system 10. In the embodiment illustrated in FIG. 1, at least a portion of the first connector assembly 22F is connected to the first tether end 24F and at least a portion of the second connector assembly 22S is connected to the second tether end 24S. The connector assemblies 22F, 22S, can be connected to the first tether end 24F and the second tether end 24S via any suitable manner or method. Further, at least a portion of the first connector assembly 22F is connected to a portion of the first latch assembly 18F and at least a portion of the second connector assembly 22S is connected to a portion of the second latch assembly 18S. The first connector assembly 22F can be connected to the first latch assembly 18F via any suitable manner or method. The second connector assembly 22S can also be connected to the second latch assembly 18S via any suitable manner or method. Additionally, and/or alternatively, the connector assemblies 22F, 22S, can be coupled or connected to any other suitable structures or components of the leash system 10, which may include the handle assembly 20, for example.

Figure 2A:
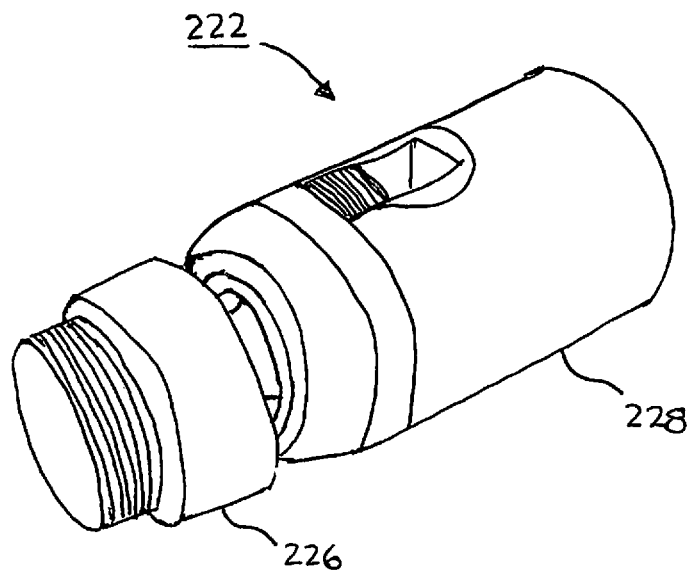
FIG. 2A is a perspective view of an embodiment of a connector assembly of the leash system.

FIG. 2A is a perspective view of an embodiment of the connector assembly 222. In the embodiment illustrated in FIG. 2A, the connector assembly 222 includes a connector 226 and a connector receiver 228. The connector 226 can be configured to be inserted into and/or to become engaged with the connector receiver 228. The connector receiver 228 can be configured to receive and/or to become engaged with the connector 226. It is further recognized that the connector assembly 222 can include fewer or additional components than those specifically illustrated and described herein.

It is understood that the connector receiver 228 can move between a locked position and an unlocked position. As used herein, in some embodiments, while the connector receiver 228 is in the "locked position" the connector 226 cannot be inserted into and/or become engaged with the connector receiver 228. In other words, in the locked position, the connector receiver 228 cannot receive the connector 226. In other embodiments, the connector 226 cannot be separated and/or disengaged from the connector receiver 228 when the connector receiver 228 is in the locked position. In certain embodiments, the connector receiver 228 is biased towards the locked position.

Contrarily, when the connector receiver is in the "unlocked position" the connector 226 can be inserted into and/or become engaged with the connector receiver 228. Stated another way, the connector receiver 228 can receive the connector 226. Furthermore, the connector 226 can be separated and/or disengaged from the connector receiver 228 when the connector receiver 228 is in the unlocked position. While the configuration of the connector receiver 228 can move between the locked and the unlocked positions, the configuration of the connector 226 does not change.

Although it is referred to herein that the connector receiver 228 can move between the locked position and the unlocked position, it is recognized that various components or structures of the connector receiver 228 can also move between the locked position and the unlocked position.

Figure 2B:
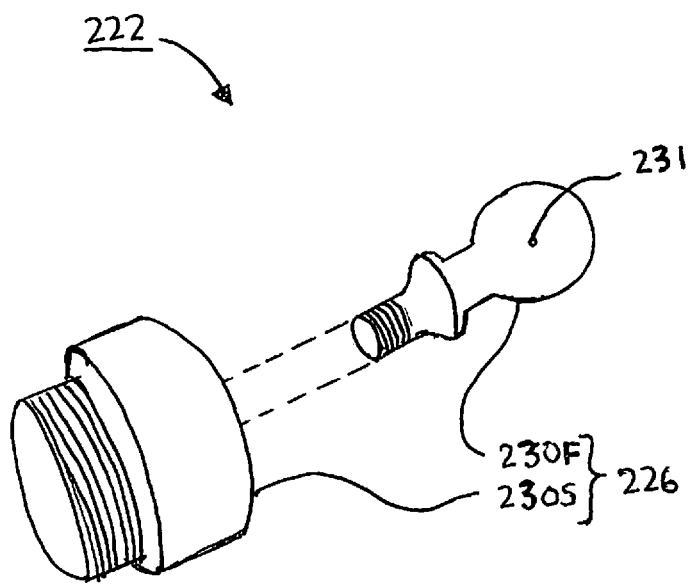
FIG. 2B is an exploded view of a connector of the connector assembly in FIG. 2A.

FIG. 2B is an exploded view of the connector 226 of the connector assembly 222 in FIG. 2A. In this embodiment, at least a portion of the connector 226 can be configured to insert into or otherwise engage with the connector receiver 228 (illustrated in FIG. 2A). At least a portion of the connector 226 can also be configured to attach to various other structures or components of the leash system 10, such as the tether 14 (illustrated in FIG. 1), the latch assemblies 18F, 18S (illustrated in FIG. 1) or the handle assembly 20 (illustrated in FIG. 1), as non-exclusive examples. The design of the connector 226 can vary. In the embodiment illustrated in FIG. 2B, the connector 226 can include a first connector end 230F and a second connector end 230S. It is recognized that the terms "first connector end 230F" and "second connector end 230S" can be used interchangeably. While illustrated as two separate components, in certain embodiments, the first connector end 230F and the second connector end 230S can be formed as a unitary structure.

The first connector end 230F can be configured to insert into and/or otherwise engage with the connector receiver 228. The first connector end 230F can insert into and/or otherwise engage with the connector receiver 228 via any suitable manner or method. In this embodiment, the first connector end 230F can include a somewhat spherical shape or configuration. As referred to herein, "somewhat spherical" can include any suitable and/or substantially rounded or curved configuration. With this configuration, the first connector end 230F can include a connector end center 231, which includes the center of the substantially spherical first connector end 230F. Alternatively, the first connector end 230F can include any other suitable configuration or geometry.

The second connector end 230S can be configured to attach to various structures or components of the leash system 10. In this embodiment, at least a portion of the second connector end 230S can include a thread or helical structure that allows the second connector end 230S to connect or attach to the various structures or components of the leash system 10. Alternatively, the second connector end 230S can have any other suitable design and/or can connect or attach to the various structures or components of the leash system 10 via any suitable manner or method. Additionally, and/or in the alternative, at least a portion of the second connector end 230S can include a concave and/or somewhat semi-spherical shape or configuration, or any other suitable configuration or geometry.

Figure 2C:
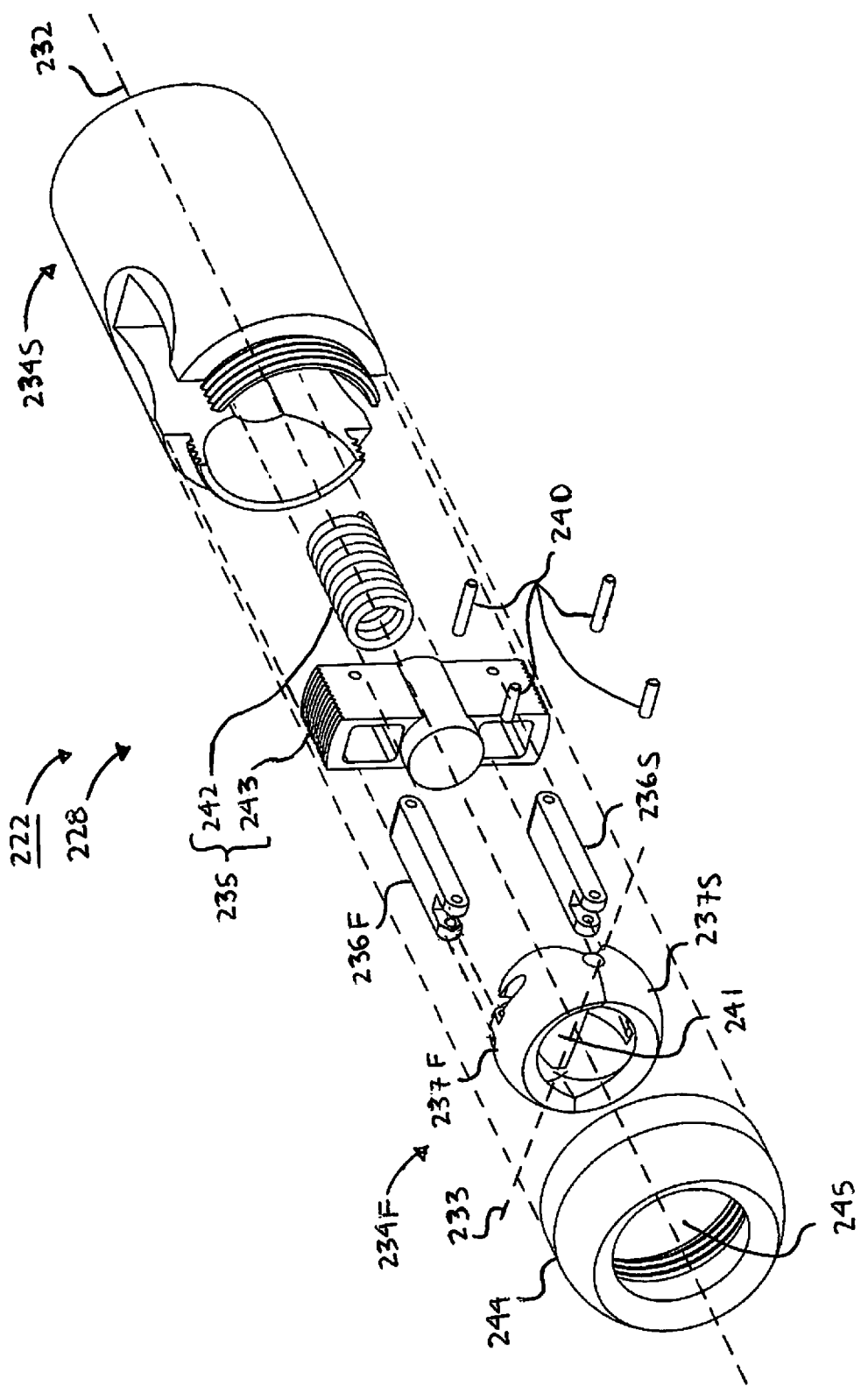
FIG. 2C is an exploded view of a connector receiver of the connector assembly in FIG. 2A.

FIG. 2C is an exploded view of the connector receiver 228 of the connector assembly 222 in FIG. 2A. In this embodiment, at least a portion of the connector receiver 228 can be configured to receive and/or otherwise engage with at least a portion of the connector 226 (illustrated in FIGS. 2A and 2B), i.e., the first connector end 230F (illustrated in FIG. 2B). In other words, the connector receiver 228 can receive and/or otherwise engage with the first connector end 230F by encircling or engaging at least a portion of the first connector end 230F. At least a portion of the connector receiver 228 can also be configured to attach to various structures or components of the leash system 10 (illustrated in FIG. 1), such as the tether 14 (illustrated in FIG. 1), the latch assemblies 18F, 18S (illustrated in FIG. 1) or the handle assembly 20 (illustrated in FIG. 1), as non-exclusive examples.

The design of the connector receiver 228 can vary depending on the design requirements of the leash system 10. In the embodiment illustrated in FIG. 2C, the connector receiver 228 includes a longitudinal axis 232 and a pivot axis 233. Further, in this embodiment, the connector receiver 228 can include a first receiver end 234F, a second receiver end 234S and a receiver assembly 235. It is recognized that the terms "first receiver end 234F" and "second receiver end 234S" can be used interchangeably. It is also recognized that the connector receiver 228 can include fewer or additional components than those specifically illustrated and described herein.

The first receiver end 234F can be configured to receive and/or otherwise engage with the first connector end 230F. The first receiver end 234F can receive and/or otherwise engage to the first connector end 230F via any suitable manner or method. The design of the first receiver end 234F can also vary to include various components. In some embodiments, the first receiver end 234F can include a first gate attachment member 236F and a first gate 237F. In the embodiment illustrated in FIG. 2C, the first receiver end 234F includes a first gate attachment member 236F, a second gate attachment member 236S, a first gate 237F and a second gate 237S. It is recognized that the terms "first gate attachment member 236F" and "second gate attachment member 236S" can be used interchangeably. Also, the terms "first gate 237F" and "second gate 237S" can be used interchangeably. While the first receiver end 234F is described herein as including two gate attachment members, 236F, 236S and two gates 237F, 237S, it is understood that the first receiver end 234F can include any number of gate attachment members 236F, 236S and/or gates 237F, 237S, i.e., including one, two, etc.

The first gate attachment member 236F and the second gate attachment member 236S are positioned within an interior of the connector receiver 228. The design and/or length of the first gate attachment member 236F and the second gate attachment member 236S can be varied. In certain embodiments, the first gate attachment member 236F can extend from a portion of the receiver assembly 235 to the first gate 237F and the second gate attachment member 236S can extend from a portion of the receiver assembly 235 to the second gate 237S. The first gate attachment member 236F and the second gate attachment member 236S can be coupled or connected to a portion of the receiver assembly 235, the first gate 237F and/or the second gate 237S via any suitable manner or method. As one non-exclusive example, in the embodiment illustrated in FIG. 2C, the first gate attachment member 236F and the second gate attachment member 236S are coupled to a portion of the receiver assembly 235, the first gate 237F and/or the second gate 237S with one or more pins 240. The pins 240 are inserted into at least a portion of the receiver assembly 235, the first gate 237F and/or the second gate 237S. The pins 240 can be of any suitable design and/or length.

The first gate 237F and the second gate 237S can be configured to encircle or otherwise engage at least a portion of the first connector end 230F. The design of the first gate 237F and the second gate 237S can be varied depending on the design requirements of the leash system 10. In the embodiment illustrated in FIG. 2C, the first gate 237F and the second gate 237S are coupled. The first gate 237F and the second gate 237S can be coupled via any suitable manner or method. Furthermore, in this embodiment, the first gate 237F and the second gate 237S have a somewhat spherical configuration. With this configuration, the first gate 237F and the second gate 237S can form at least a portion of a connector cavity 241 that also has a partially spherical shape or configuration, i.e., forming at least a portion of a sphere. The connector cavity 241 can be configured to receive the first connector end 230F. The diameter of the first connector end 230F can be substantially similar to the diameter of the connector cavity 241. In other words, the diameter of the first connector end 230F can be substantially equal to or the same as the diameter of the connector cavity 241. Accordingly, the diameter of the connector cavity 241 and the diameter of the first connector end 230F may deviate by approximately 1 mm, 2 mm, 3 mm, etc., for example, and remain "substantially" similar or the same. Use of the term "substantially" is intended, therefore, to allow for moderate deviations. Alternatively, the size, shape and/or design of the connector cavity 241 can vary depending on the design and/or shape of the first connector end 230F, or vice versa. As such, the connector cavity 241 can include any other dimension substantially similar to the first connector end 230F.

Additionally, in certain embodiments, the first gate 237F and the second gate 237S can rotate about the pivot axis 233. As referred to herein, in one embodiment, the pivot axis 233 is substantially perpendicular to the longitudinal axis 232 of the connector receiver 228. The first gate 237F and the second gate 237S can rotate about the pivot axis 233 in any suitable manner. In one embodiment, the first gate 237F can be coupled to the second gate 237S at the pivot axis 233.

The receiver assembly 235 is coupled to the connector receiver 228 and allows the connector receiver 228 to move between the locked and unlocked positions. The receiver assembly 235 can be coupled to the connector receiver 228 via any suitable manner or method. The design of the receiver assembly 235 can also vary. In this embodiment, the receiver assembly 235 can include a spring 242 and a receiver actuator 243. It is recognized that the receiver assembly 235 can include fewer or additional components than those specifically illustrated and described herein.

The spring 242 is positioned within the interior of the connector receiver 228. More specifically, the spring 242 can be positioned between the first receiver end 234F and the second receiver end 234S. In the embodiment illustrated in FIG. 2C, the spring 242 may be partially positioned within a portion of the receiver actuator 243. Furthermore, the spring 242 can engage at least a portion of the receiver actuator 243 and/or the connector receiver 228, which can cause the spring 242 to compress.

The receiver actuator 243 can have any suitable design. Accordingly, the receiver actuator 243 can be manipulated, i.e., moved, depressed, slid, etc., in order to move the connector receiver 228, including the first gate 237F and the second gate 237S, between the locked and unlocked positions. For example, in one such embodiment, the receiver actuator 243 can include a switch, wherein the receiver actuator 243 can be selectively moved to discrete positions within a slot to move the connector receiver 228 between the locked and unlocked positions. Similarly, the receiver actuator 243 can include a lever that can be selectively moved to discrete positions within the slot to move the connector receiver 228 between the locked and unlocked positions. Alternatively, the receiver actuator 243 can include a button that is coupled to the connector receiver 228. In such embodiment, depressing the button can move the connector receiver 228 between the locked and unlocked positions. Still alternatively, the receiver actuator 243 can include a slidable element, wherein the receiver actuator 243 can be selectively slid to discrete positions within the slot to move the connector receiver 228 between the locked and unlocked positions.

In some embodiments, the first receiver end 234F can also include a receiver cap 244 that can encase at least a portion of the structures or components of the connector receiver 228, including the first gate attachment member 236F, the second gate attachment member 236S, the first gate 237F, the second gate 237S, etc. The design of the receiver cap 244 can vary. In this embodiment, the receiver cap 244 can include a somewhat semi-spherical shape or configuration. In other embodiments, the receiver cap 244 can include any other suitable configuration or geometry. For example, in one embodiment, receiver cap 244 can have the somewhat semi-spherical shape or configuration and the second connector end 230S (illustrated in FIGS. 2A and 2B) can include an opposing concave semi-spherical shape or configuration, which can allow rotational movement when the first connector end 230F is engaged with at least a portion of the first receiver end 234F.

While encasing the structures or components of the connector receiver 228, the receiver cap 244 may still allow for the first connector end 230F to be inserted into and/or otherwise engaged with the first receiver end 234F. Accordingly, the receiver cap 244 can include a cap opening 245 with a diameter or other dimension that is substantially similar to or greater than the diameter or other dimension of the first connector end 230F.

The receiver cap 244 can connect or attach to the first receiver end 234F. The receiver cap 244 can attach to the first receiver end 234F via any suitable manner or method. In this embodiment, a portion of the receiver cap 244 can include a thread or helical structure that allows the receiver cap 244 to attach to the first receiver end 234F. In such embodiment, at least a portion of the first receiver end 234F may also include the thread or helical structure.

The second receiver end 234S can be configured to connect or attach to various structures or components of the leash system 10. For example, in one embodiment the second receiver end 234S can include a thread or helical structure that allows the second receiver end 234S to connect or attach to the various structures or components of the leash system 10. Alternatively, the second receiver end 234S can include any other suitable design and/or can connect or attach to the various structures or components of the leash system 10 via any suitable manner or method.

Figure 3A:
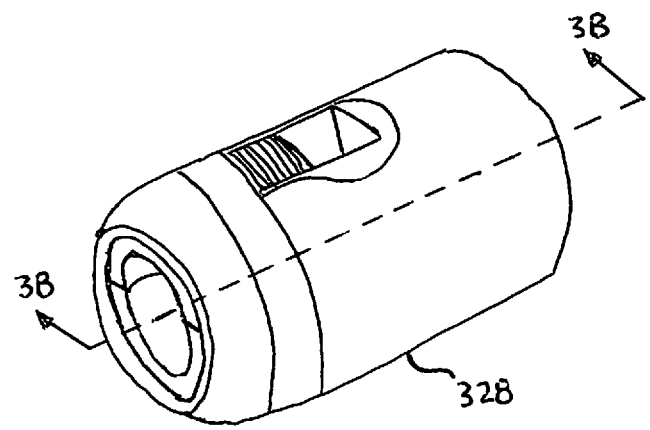
FIG. 3A is a perspective view of an embodiment of the connector receiver, shown in a locked position.

FIG. 3A is a perspective view of an embodiment of the connector receiver 328 in the locked position. In the embodiment illustrated in FIG. 3A, the connector 226 (illustrated in FIGS. 2A and 2B) has been omitted.

Figure 3B:
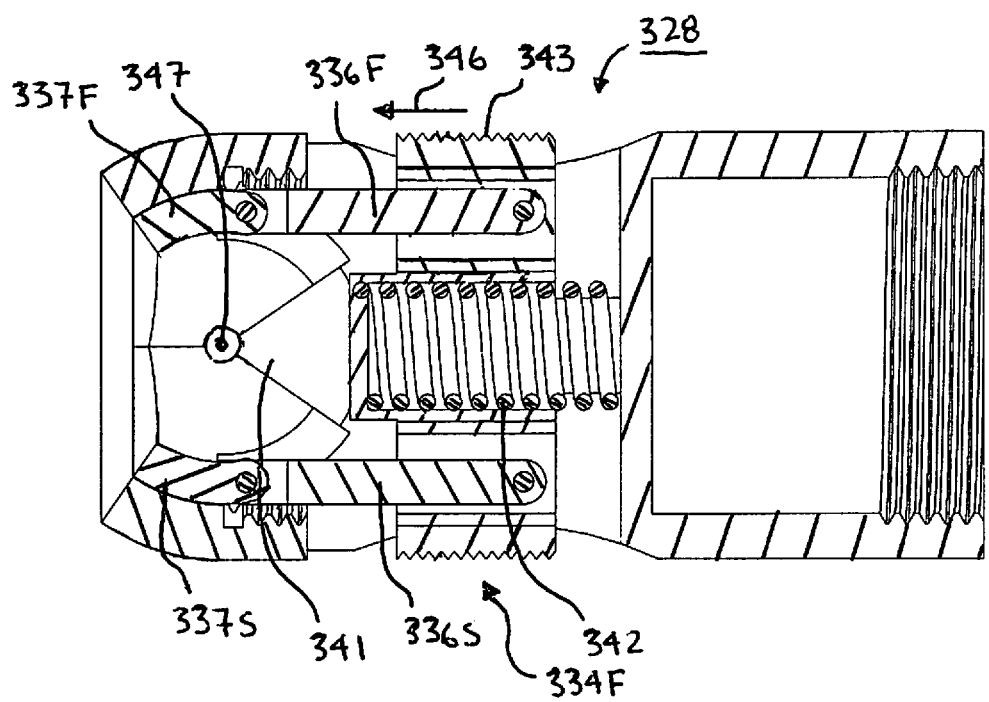
FIG. 3B is a cross-sectional view of the connector receiver taken on line 3B-3B in FIG. 3A.

FIG. 3B is a cross-sectional view of the connector receiver 328 taken on line 3B-3B in FIG. 3A. FIG. 3B shows the connector receiver 328 in the locked position. In various embodiments, such as the embodiment illustrated in FIG. 3B, the connector receiver 328 is biased toward the locked position. In other words, the spring 342 is biased to maintain the connector receiver 328 in the locked position when the spring 342 is resting. In this embodiment, the receiver actuator 343 can also be biased in a first direction of arrow 346, which can selectively maintain the first gate 337F and the second gate 337S in the locked position. More specifically, the first gate 337F can be coupled to the receiver actuator 343 via the first gate attachment member 336F and the second gate 337S can be coupled to the receiver actuator 343 via the second gate attachment member 336S. Accordingly, in certain embodiments, the first gate 337F and the second gate 337S can be biased toward the locked position as the spring 342 is resting.

For example, in the embodiment in FIG. 3B, the spring 342 is at least partially positioned within a portion of the receiver actuator 343, with the spring 342 engaging at least a portion of the receiver actuator 343. When the spring 342 is resting, the first gate attachment member 336F and the second gate attachment member 336S are biased towards the second connector end 230S (illustrated in FIG. 2B) in the first direction of arrow 346. Accordingly, the first gate 337F and the second gate 337S are also biased in the direction of arrow 346, such that the first gate 337F and the second gate 337S extend passed the connector end center 231 (illustrated in FIG. 2B) in a direction toward the second connector end 230S to inhibit the first connector end 230F (illustrated in FIG. 2B) from separating from the connector cavity 341 or disengaging from a portion of the first receiver end 334F.

Additionally, in FIG. 3B, the connector cavity 341 has least a partially spherical shape or configuration. With this configuration, the connector cavity 341 can include a cavity center 347, which includes the center of the at least partially spherical connector cavity 341.

Figure 4A:
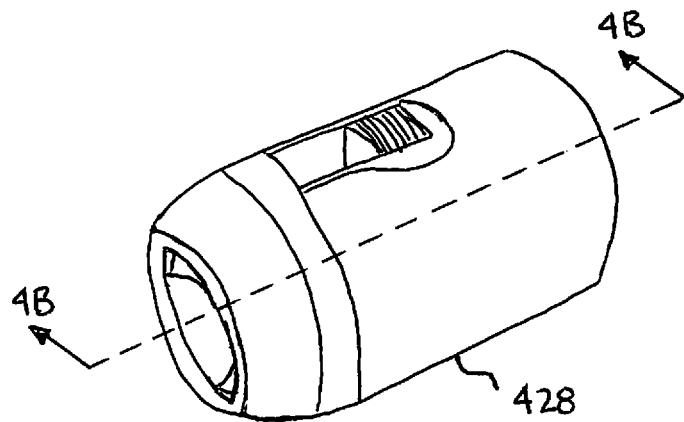
FIG. 4A is a perspective view of an embodiment of the connector receiver, shown in an unlocked position.

FIG. 4A is a perspective view of an embodiment of the connector receiver 428 in the unlocked position. In the embodiment illustrated in FIG. 4A, the connector 226 (illustrated in FIGS. 2A and 2B) has been omitted.

Figure 4B:
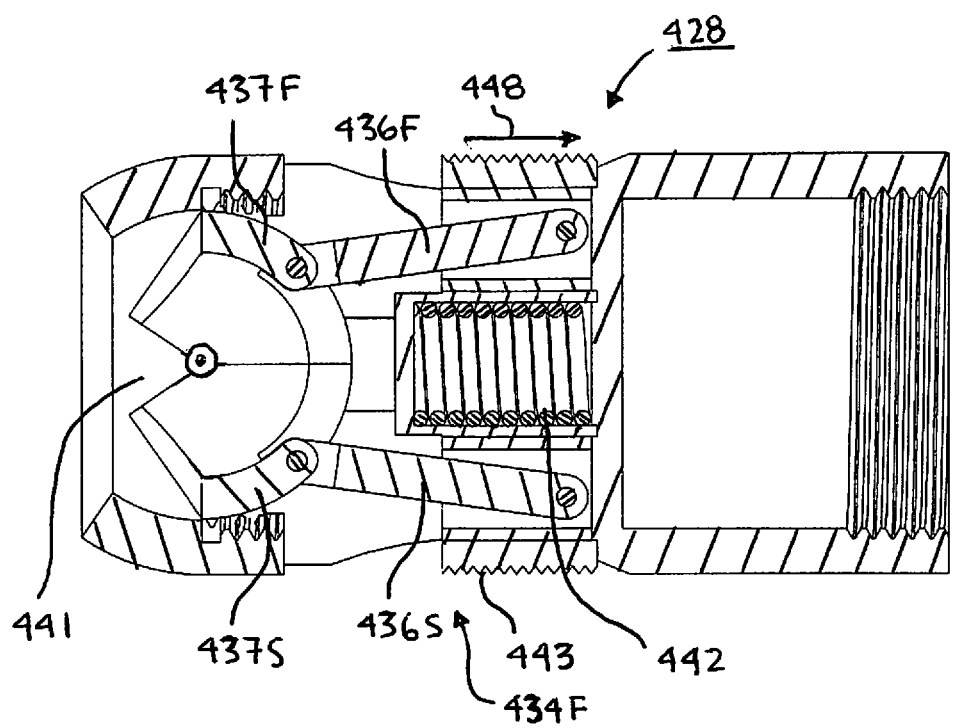
FIG. 4B is a cross-sectional view of the connector receiver taken on line 4B-4B in FIG. 4A.

FIG. 4B is a cross-sectional view of the connector receiver 428 taken on line 4B-4B in FIG. 4A. The embodiment illustrated in FIG. 4B shows the connector receiver 428 in the unlocked position. In this embodiment, the first gate 437F can be coupled to the receiver actuator 443 via the first gate attachment member 436F and the second gate 437S can be coupled to the receiver actuator 443 via the second gate attachment member 436S. Accordingly, in certain embodiments, the first gate 437F and the second gate 437S can be configured to move between the locked position and the unlocked position. In this embodiment, the first gate 437F and the second gate 437S can be configured to move to the unlocked position as the receiver actuator 443 is manipulated. The connector receiver 428, including the first gate 437F and the second gate 437S, can then return to the locked position when the receiver actuator 443 is not being manipulated. In other words, in various embodiments, the connector receiver 428, including the first gate 437F and the second gate 437S, remains in the locked position unless the receiver actuator 443 is manipulated.

For example, in the embodiment in FIG. 4B, the spring 442 is at least partially positioned within a portion of the receiver actuator 443, with the spring 442 engaging at least a portion of the receiver actuator 443 and/or the connector receiver 428. When the receiver actuator 443 is manipulated, i.e., moved in a second direction of arrow 448, which is opposite the first direction of arrow 346 (illustrated in FIG. 3B), the spring 442 is compressed. As the receiver actuator 443 is manipulated to compress the spring 442, the first gate attachment member 436F and the second gate attachment member 436S can move in the second direction of arrow 448. Movement of the first gate attachment member 436F and the second gate attachment member 436S in the second direction of arrow 448 can simultaneously cause the first gate 437F and the second gate 437S to rotate from the locked position to the unlocked position. In other words, movement of the first gate attachment member 436F and the second gate attachment member 436S can simultaneously cause the first gate 437F and the second gate 437S to rotate relative to the pivot axis 233 (illustrated in FIG. 2C) in substantially the same second direction of arrow 448 in order to move the first gate 437F and the second gate 437S between the locked position and the unlocked position.

When in the unlocked position, the first connector end 230F (illustrated in FIGS. 2A and 2B) can be inserted into and/or become engaged with at least a portion of the first receiver end 434F. In other words, the connector cavity 441 can receive the first connector end 230F. Furthermore, the first connector end 230F can be separated from the connector cavity 441 and/or disengaged from a portion of the first receiver end 434F. Accordingly, the unlocked position can further include a position of the connector receiver 428 wherein the first gate 437F and/or the second gate 437S are configured to allow the first connector end 230F to engage and/or disengage from at least a portion of the first receiver end 434F and/or to allow the connector cavity 441 to receive the first connector end 230F.

Figure 5A:
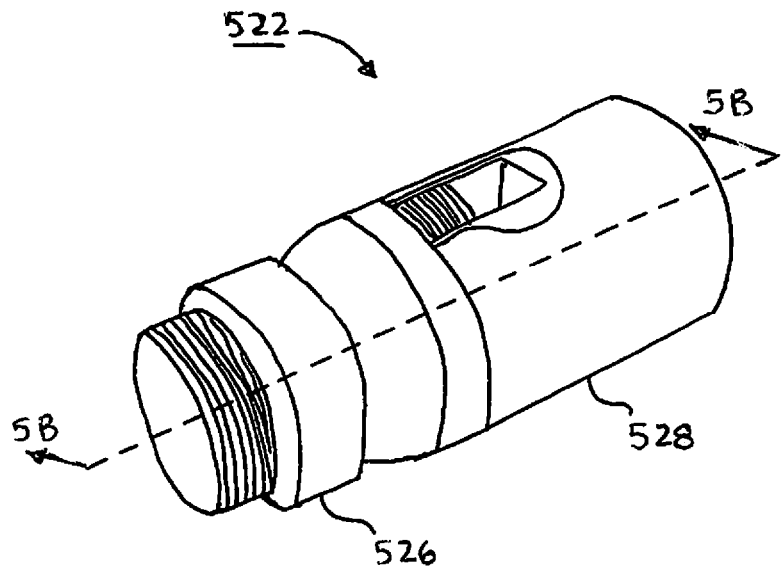
FIG. 5A is a perspective view of the connector assembly, including the connector receiver shown in the locked position.

FIG. 5A is a perspective view of another embodiment of the connector assembly 522. In the embodiment illustrated in FIG. 5A, the connector assembly 522 includes the connector 526 and the connector receiver 528. In this embodiment, the connector receiver 528 is shown in the locked position.

Figure 5B:
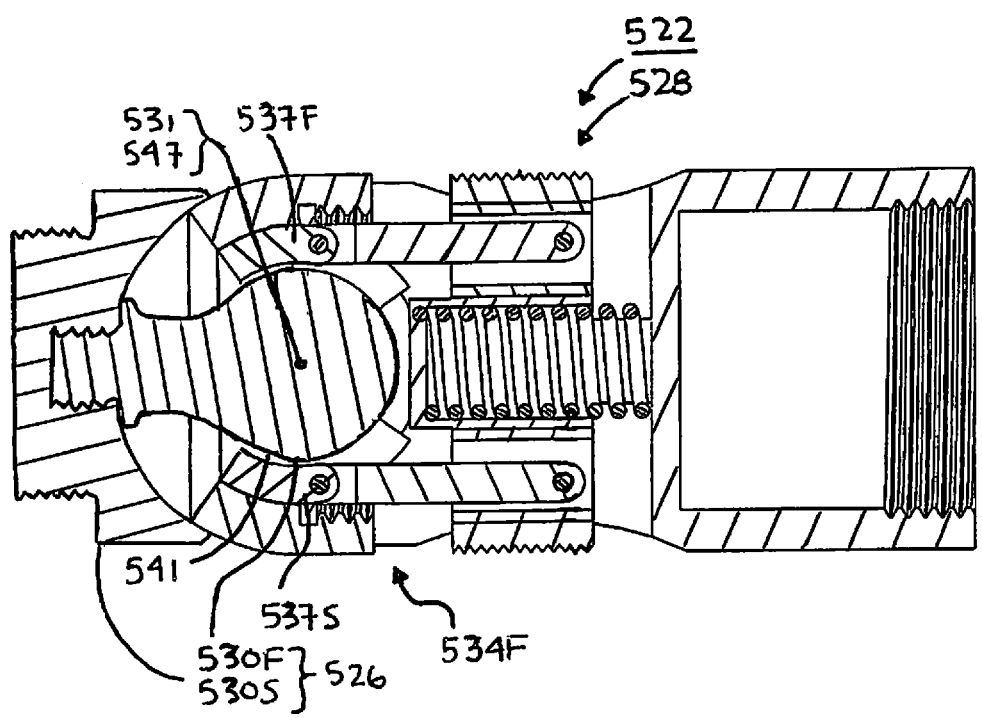
FIG. 5B is a cross-sectional view of the connector assembly taken on line 5B-5B in FIG. 5A.

FIG. 5B is a cross-sectional view of the connector assembly 522 taken on line 5B-5B in FIG. 5A. The embodiment illustrated in FIG. 5B shows the connector receiver 528 in the locked position. In FIG. 5B, the connector 526 is engaged with the connector receiver 528. More particularly, the connector cavity 541 has received the first connector end 530F. Stated another way, the first connector end 530F has been inserted into the connector cavity 541 and/or otherwise engaged with a portion of the first receiver end 534F. Both the first connector end 530F and the connector cavity 541 have the somewhat and/or at least partially spherical shape or configuration. Further, the diameter of the first connector end 530F is substantially similar to the diameter of the connector cavity 541. In other words, the diameter of the first connector end 530F can be substantially equal to or the same as the diameter of the connector cavity 541. Accordingly, the connector end center 531 and the cavity center 547 can be substantially similar or identical. With this configuration, the first connector end 530F can rotate when it is engaged with at least a portion of the first receiver end 534F. In various embodiments, the first connector end 530F can rotate in nearly any direction.

As shown in FIG. 5B, when in the locked position, the first gate 537F and the second gate 537S can encircle or otherwise engage with a portion of the first connector end 530F. As used herein in reference to the locked position, "portion" refers to any portion of the first connector end 530F wherein the first gate 537F and the second gate 537S extend passed the connector end center 531 in a direction toward the second connector end 530S of the connector 526 to inhibit the first connector end 530F from separating from the connector cavity 541 or disengaging from a portion of the first receiver end 534F. Again, with this configuration, the first gate 537F and the second gate 537S can engage or contact at least a portion of the first connector end 530F, which can provide a more secure and reliable connection.

Figure 6A:
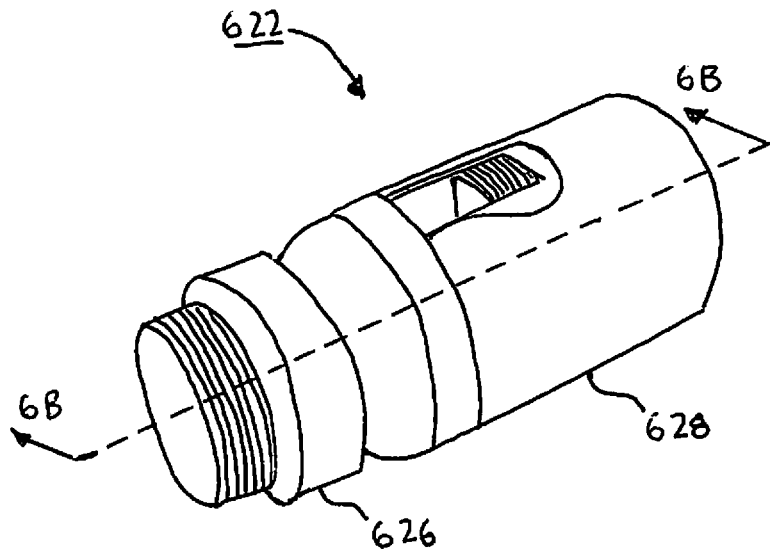
FIG. 6A is a perspective view of the connector assembly, including the connector receiver shown in the unlocked position.

FIG. 6A is a perspective view of another embodiment of the connector assembly 622. In the embodiment illustrated in FIG. 6A, the connector assembly 622 includes the connector 626 and the connector receiver 628. However, in this embodiment, the connector receiver 628 is shown in the unlocked position.

Figure 6B:
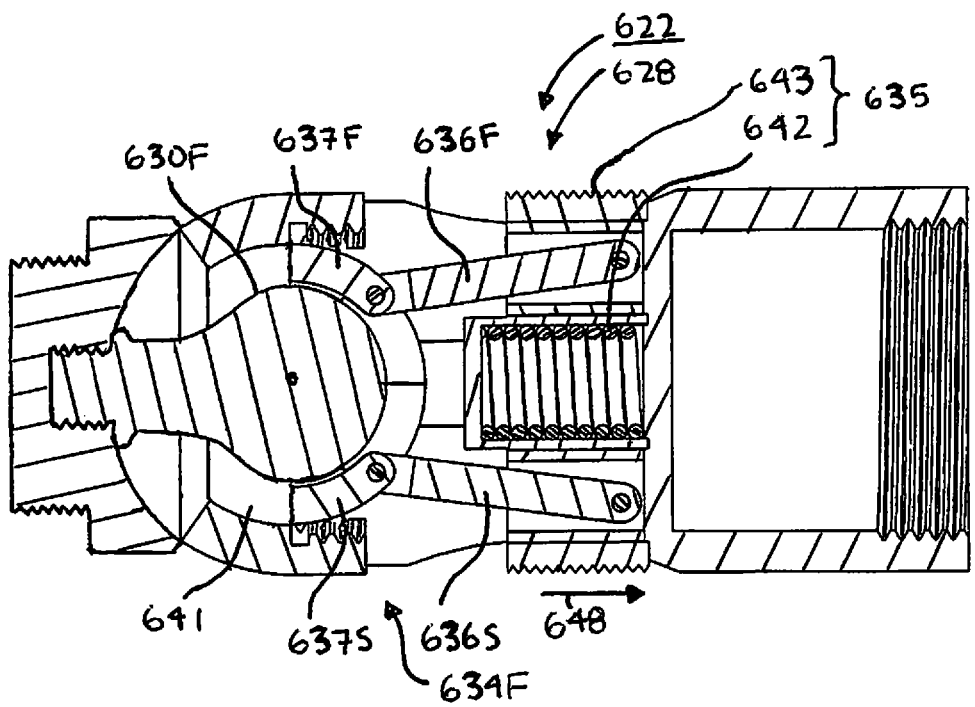
FIG. 6B is a cross-sectional view of the connector assembly taken on line 6B-6B in FIG. 6A.

FIG. 6B is a cross-sectional view of the connector assembly 622 taken on line 6B-6B in FIG. 6A. The embodiment illustrated in FIG. 6B shows the connector receiver 628 in the unlocked position. When in the unlocked position, the first connector end 630F can be inserted into and/or become engaged with at least a portion of the first receiver end 634F. In other words, the connector cavity 641 can receive the first connector end 630F. Furthermore, the first connector end 630F can be separated from the connector cavity 641 and/or disengaged from a portion of the first receiver end 634F. Accordingly, the unlocked position can further include a position of the connector receiver 628 wherein the first gate 637F and the second gate 637S are configured to allow the first connector end 630F to engage and/or disengage from at least a portion of the first connector end 634F and/or to allow the connector cavity 641 to receive the first connector end 630F.

Additionally, in some embodiments, the receiver assembly 635 can be configured to allow insertion of the first connector end 630F into the connector cavity 641 absent manual movement of the receiver actuator 643. As used herein, the term "manual" can include the user using his or her hand(s) to control at least a portion of the leash system 10. For example, in the embodiment in FIG. 6B, the spring 642 is at least partially positioned within a portion of the receiver actuator 643, with the spring 642 engaging at least a portion of the receiver actuator 643 and/or the connector receiver 628. In this embodiment, the first gate attachment member 636F is coupled to the receiver actuator 643 and the first gate 637F and the second gate attachment member 636S is coupled to the receiver actuator 643 and the second gate 637S, such that inserting the first connector end 630F can cause the spring 642 to compress to overcome the bias, which may then cause the first gate 637F and the second gate 637S to rotate to the unlocked position.

More particularly, in FIG. 6B, the first connector end 630F can engage and/or contact a portion of the first gate 637F and the second gate 637S as the first connector end 630F is being inserted into the connector cavity 641 and/or engaged with at least a portion of the first receiver end 634F, causing the spring 642 to compress. Compression of the spring 642 can allow the first gate attachment member 636F and the second gate attachment member 636S to move in the direction of arrow 648, which simultaneously can cause the first gate 637F and the second gate 637S to rotate to the unlocked position. In other words, the first gate 637F and the second gate 637S can rotate relative to the pivot axis 233 (illustrated in FIG. 2C) in substantially the same direction of arrow 648. With the configuration described above, the connector cavity 641 can receive the first connector end 630F without any manual movement of the release actuator 643. Additionally, the bias of the spring 642 can be overcome without movement of the release actuator 643.

Figure 7:
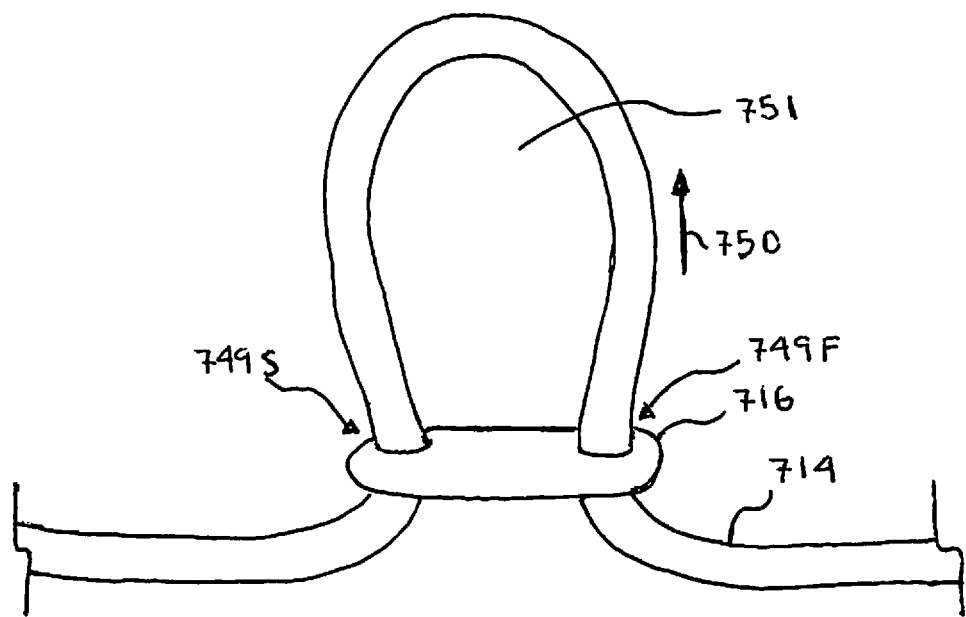
FIG. 7 is a perspective view of one embodiment of a harness attachment of the leash system.

FIG. 7 is a perspective view of one embodiment of the harness attachment 716. The harness attachment 716 can allow the tether 714 to serve as a snout harness (not shown). In other words, the harness attachment 716 is configured to allow the tether 714 to encircle and/or tighten around the snout or muzzle of the dog 12 (illustrated in FIG. 1). In this embodiment, the harness attachment 716 can include two or more apertures (i.e., a first aperture 749F and a second aperture 749S) spaced some distance apart, similar to a "FIG. 8" piece, for example. The tether 714 can be inserted through the apertures 749F, 749S while still allowing the harness attachment 716 to slide or move along the tether 714. The snout harness can then be formed by pulling the portion of the tether 714 between the apertures 749F, 749S substantially perpendicular from the harness attachment 716 (in the direction of arrow 750, for example) forming a harness loop 751. The harness loop 751 can then be placed to encircle and/or tighten around the snout or muzzle of the dog 12. In some embodiments, the harness attachment 716 may also be used in conjunction with other components of the leash system 10, such as the latch assemblies 18F, 18S (illustrated in FIG. 1), to form the snout harness. It is understood that the harness attachment 716 can include additional components than those specifically illustrated and described herein.

In alternative embodiments, the harness attachment 716 can include one or more straps, clips or flat fabric, as non-exclusive examples. For example, in such alternative embodiments, the harness attachment 716 can be coupled, connected or secured to the tether 714 at some distance apart, but loose enough to allow the harness attachment 716 to slide or move along the tether 714. The tether 714 can be formed into the harness loop 751 to encircle the snout or muzzle of the dog 12. The harness loop 751 can then be tightened around the snout or muzzle of the dog 12 by sliding the two ends of the harness attachment 716 towards each other until desired snugness or tightness is achieved. Additionally, and/or alternatively, the harness attachment 716 can include any other suitable design.

Figure 8:
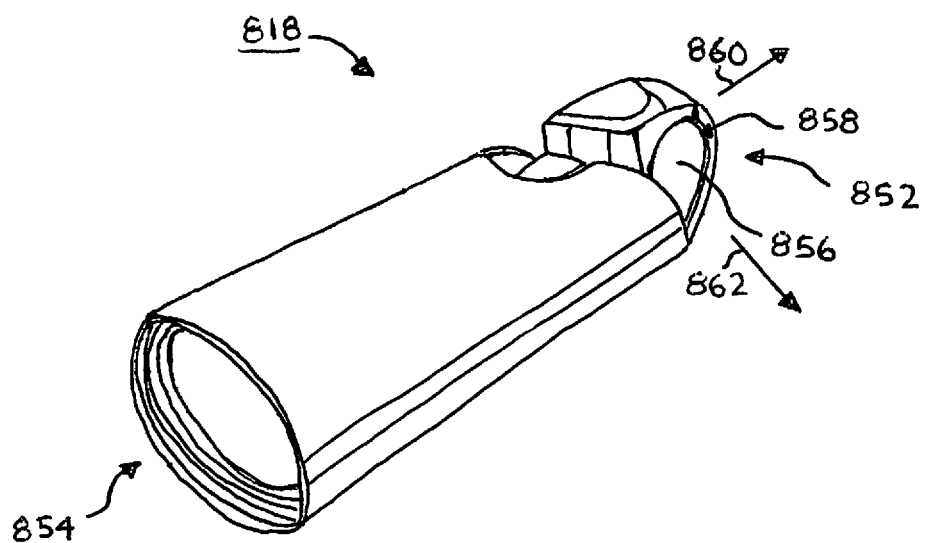
FIG. 8 is a perspective view of one embodiment of a latch assembly of the leash system.

FIG. 8 is a perspective view of one embodiment of the latch assembly 818. The design of the latch assembly 818 can vary. In the embodiment illustrated in FIG. 8, the latch assembly 818 can include a latching end 852 and a latch attachment end 854. It is understood that the latch assembly 818 can include fewer or additional components than those specifically illustrated and described herein.

The latching end 852 of the latch assembly 818 can be configured to latch or clasp to various locations on the tether 14 (illustrated in FIG. 1). In certain embodiments, the latching end 852 can include a latch cavity 856 having a latch cavity diameter 858. In such embodiments, the latch cavity diameter 858 can be substantially similar to or the same as the diameter of the tether 14. Accordingly, the latch cavity diameter 858 and the diameter of the tether 14 may deviate by approximately 1 mm, 2 mm, 3 mm, etc., for example, and remain substantially similar. Alternatively, the size, shape and/or design of the latch cavity 856 can vary depending on the design and/or shape of the tether 14. As such, the latch cavity 856 can include any other dimension substantially similar to the tether 14.

Additionally, the latch cavity diameter 858 can include relatively sharp edges, which can cause increased friction when the latching end 852 is latched or clasped to the tether 14. For example, as the tether 14 is pulled substantially perpendicular (i.e., in the direction of arrow 860, for example) relative to a point where the latching end 852 is latched or clasped to the tether 14, friction may increase as the pulling force increases, which can prevent the latch assembly 818 from moving or slipping. In other words, the relatively sharp edges of the latch cavity diameter 858 can fasten to or grip the tether 14. Alternatively, the tether 14 can move freely within the latch cavity 856 when pulled through in a substantially parallel direction (i.e., in the direction of arrow 862, for example).

This configuration can allow the latch assembly 818 to create an adjustable loop (not shown) with the tether 14. The adjustable loop can include varying sizes. As such, the latch assembly 818 can be latched or clasped onto the tether 14 to encircle and/or tightened around various fixed or movable objects without the use of a knot, which can include a waist or other body part of the user, or a pole, a tree or a table leg, as non-exclusive examples. This not only creates an easier and quicker way to attach or secure the tether 14 to fixed or movable objects, but it also can inhibit the tether 14 from resting on the ground to limit the potential of trip hazards, leash tangling, or the dog 12 (illustrated in FIG. 1) urinating on the tether 14.

The latch attachment end 854 can be coupled and/or connected to either the first tether end 24F (illustrated in FIG. 1) or the second tether end 24S (illustrated in FIG. 1). In one embodiment, the latch attachment end 854 may be connected to at least a portion of the connector assemblies 22F, 22S (illustrated in FIG. 1). Alternatively, the latch attachment end 854 may be coupled and/or connected to any other suitable structure or component of the leash system 10.

In an alternative embodiment, the latch assembly 818, i.e., the latching end 852, can include an inner cylinder (not shown) and an outer cylinder (not shown). The inner cylinder and the outer cylinder can include an inside cylinder diameter and an outside cylinder diameter. The outside diameter of the inner cylinder can be substantially similar to the inside diameter of the outer cylinder. In such embodiment, the outer cylinder substantially encircles at least a portion of the inner cylinder.

The inner cylinder can be inclined towards one end. Both the inner and outer cylinders can also have openings (i.e., inner cylinder opening, outer cylinder opening). For example, the inner cylinder opening can include an opening located near one end of the inner cylinder that is perpendicular to the length of the inner cylinder and whose diameter is substantially similar to the inside diameter of the inner cylinder. The outer cylinder opening can also include an opening that is perpendicular to the length of the outer cylinder and whose diameter is substantially similar to the inside diameter of the outer cylinder. The outer cylinder opening can be located at a point where the inner cylinder opening lines up when pulled towards one end. More specifically, when pulled towards one end, the inner cylinder can become parallel to the outer cylinder to create the opening by causing the inner cylinder opening and the outer cylinder opening to line up. The inner cylinder can then return to a closed or resting position, which is inclined by a spring or a magnet towards one end. This configuration allows the inner cylinder opening and/or the outer cylinder opening to serve as entry and/or exit points, which can create a gate that becomes closed to an inside wall of the outer cylinder.

In another alternative embodiment, the latching end 852 of the latch assembly 818 can include the latch cavity 856. In such embodiment, the latch cavity 856 can be circular having the latch cavity diameter 858 that is substantially similar to the tether 14. Accordingly, the latching end 852 can engage or contact the tether 14. The latching end 852 can also include one or more curved gates (not shown) that allow the tether 14 to enter the latch cavity 856. The dimensions of the curved gates can vary, but can be substantially similar to the latch cavity diameter 858. The points of entry and exit (not shown) of the tether 14 can be closed and opened by the curved gates, which can be secured by tracks (not shown) that guide the curved gates on a defined path, and which can be located on the latch assembly 818.

Still in another alternative embodiment the latching end 852 of the latch assembly 818 can utilize two claws that join to make a closed circle or ring to latch or clasp onto the tether 14.

Figure 9A:
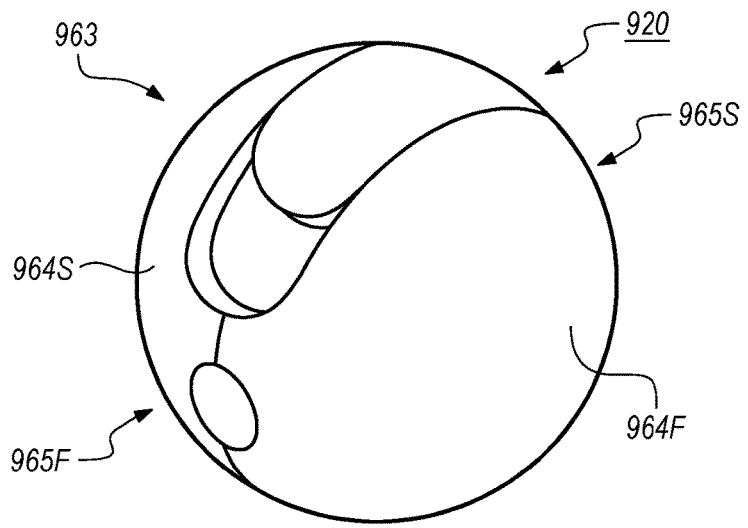
FIG. 9A is a perspective view of an embodiment of a handle assembly of the leash system.

FIG. 9A is a perspective view of an embodiment of the handle assembly 920. In the embodiment illustrated in FIG. 9A, the handle assembly 920 includes an outer housing 963. It is understood that the handle assembly 920 can include fewer or additional components than those specifically illustrated and described herein. The outer housing 963 defines a handle interior (not shown). The size, configuration and/or shape of the outer housing 963 can vary depending on the design of the handle assembly 920. In FIG. 9A, the outer housing 963 is somewhat spherical. Alternatively, the outer housing 963 can include any other suitable configuration or geometry. Additionally, the outer housing 963 can be formed from any suitable material or materials, such as a metal or metal alloy (stainless steel, titanium, aluminum, etc.), a composite material, wood, ceramic, or a relatively rigid plastic, as non-exclusive examples.

In the embodiment illustrated in FIG. 9A, the outer housing 963 can include a first outer housing member 964F and an opposed second outer housing member 964S. It is understood that the term "first outer housing member 964F" is interchangeable with "second outer housing member 964S". Alternatively, the outer housing 963 can be formed as a unitary structure. In certain embodiments, unitary structure means that the outer housing 963 is homogenously formed from one material.

In certain embodiments, such as the embodiment in FIG. 9A, the first outer housing member 964F and the second outer housing member 964S may be coupled or connected to each other in order to form the outer housing 963, wherein the outer housing 963 houses, encases and/or accommodates various components of the handle assembly 920. The first outer housing member 964F and the second outer housing member 964S may be coupled or connected via any suitable manner or method, including with pins or screws, as non-exclusive examples. In FIG. 9A, the first outer housing member 964F and the second outer housing member 964S are coupled or connected to each other, such that the handle assembly 920 has a somewhat spherical shape or configuration. Accordingly, the first outer housing member 964F and the second outer housing member 964S may form the sides, i.e., a left side or a right side, of the handle assembly 920. In various embodiments, the first outer housing member 964F and the second outer housing member 964S can be substantially symmetrical to each other. It is recognized that "substantially" in this context may include subtle differences between the first outer housing member 964F and the second outer housing member 964S. Stated another way, the first outer housing member 964F and the second outer housing member 964S are substantially mirror images of one another. As referred to herein, "mirror image" may include subtle differences and/or may include a reflected duplication that appears almost identical.

Additionally, in various embodiments, the outer housing 963 can include a first outer housing end 965F and an opposed second outer housing end 965S. It is understood that the term "first outer housing end 965F" is interchangeable with "second outer housing end 965S".

While FIG. 9A only illustrates the handle assembly 920, it is understood that the handle assembly 920 can interact or be engaged with the tether 14 (illustrated in FIG. 1). The handle assembly 920 can interact or be engaged with the tether 14 via any suitable manner or method. In various embodiments, the term "interact" as used with the handle assembly 920 means to allow movement of the tether 14. Furthermore, the term "engage" as used with the handle assembly 920 can mean to slow and/or stop movement of the tether 14. Alternatively, the term "engage" can mean to hold, fasten, clinch, secure, grip or lock on to the tether 14 to prevent movement of the tether 14 relative to handle assembly 920. In various embodiments, the handle assembly 920 can slide or move between the first tether end 24F (illustrated in FIG. 1) and the second tether end 24S (illustrated in FIG. 1). The handle assembly 920 can slide or move on the tether 14 via any suitable manner or method, such as by manual manipulation by the user, as one non-exclusive example. In alternative embodiments, the handle assembly 920 can remain static or stationary. In such embodiments, the handle assembly 920 can be coupled or connected to the first tether end 24F or the second tether end 24S. Additionally, in some embodiments, the handle assembly 920 may include and/or integrate at least a portion of the connector assemblies 22F, 22S (illustrated in FIG. 1), which can allow the handle assembly 920 to be coupled or connected to portions of the leash system 10 via the connector assemblies 22F, 22S.

Figure 9B:
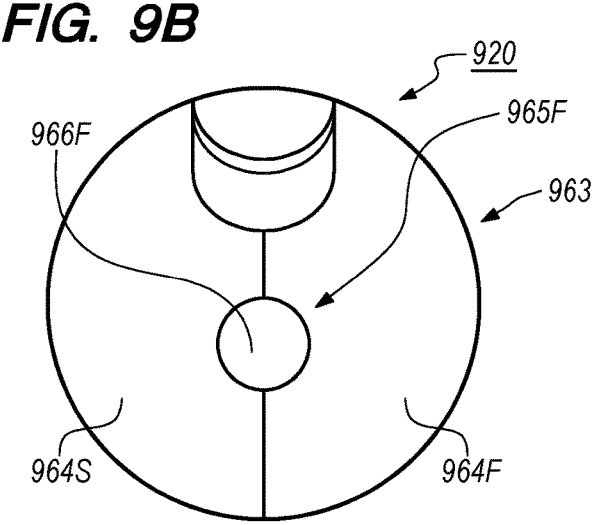
FIG. 9B is a front view of the embodiment of the handle assembly illustrated in FIG. 9A.
Figure 9C:
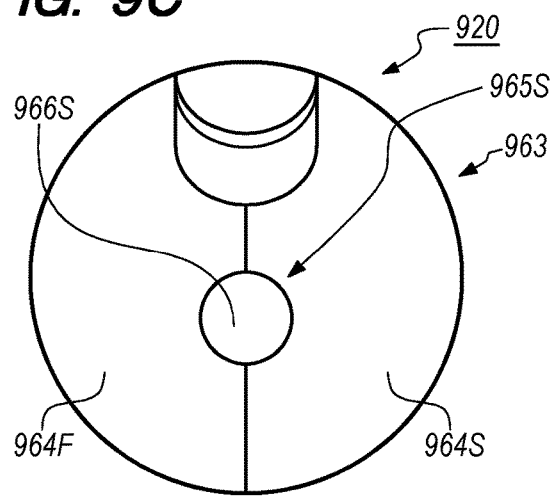
FIG. 9C is a back view of the embodiment of the handle assembly illustrated in FIG. 9A.

FIGS. 9B and 9C include a front view and a back view of the embodiment of the handle assembly 920 in FIG. 9A, respectively. For ease of reference, the tether 14 (illustrated in FIG. 1) has been omitted. In the embodiments illustrated in FIGS. 9B and 9C, the outer housing 963 includes a first housing aperture 966F on the first outer housing end 965F and an opposed second housing aperture 966S on the second outer housing end 965S. As referred to herein, the terms "first housing aperture 966F" and "second housing aperture 966S" can be interchangeable.

More specifically, in the embodiments in FIGS. 9B and 9C, the first outer housing member 964F includes a portion of the first housing aperture 966F on the first outer housing end 965F and a portion of the second housing aperture 966S on the second outer housing end 965S. Further, the second outer housing member 964S includes a portion of the first housing aperture 966F on the first outer housing end 965F and a portion of the second housing aperture 966S on the second outer housing end 965S. In FIGS. 9B and 9C, the first outer housing member 964F and the second outer housing member 964S are coupled or connected to each other, such that the first housing aperture 966F and the second housing aperture 966S may be formed.

As illustrated in FIGS. 9B and 9C, the first housing aperture 966F on the first outer housing end 965F and the second housing aperture 966S on the second outer housing end 965S allow the tether 14 to enter and exit the handle interior (not shown) of the outer housing 963 and/or handle assembly 920. In other words, the tether 14 can extend through the handle interior, by entering the first housing aperture 966F and exiting the second housing aperture 966S, or vice versa. The first housing aperture 966F and the second housing aperture 966S can include a diameter or any other dimension substantially similar to the tether 14. Further, the size, shape and/or design of the first housing aperture 966F and/or the second housing aperture 966S can vary depending on the design and/or shape of the tether 14.

FIG. 9D is an exploded view of the embodiment of the handle assembly 920 in FIG. 9A. For ease of reference, the tether 14 (illustrated in FIG. 1) has been omitted. In FIG. 9D, the handle assembly 920 includes the outer housing 963, including the first outer housing member 964F and the second outer housing member 964S, an inner housing 968 and a locking mechanism 970. It is understood that the handle assembly 920 can include fewer or additional components than those specifically illustrated and described herein.

In certain embodiments, the outer housing 963 defines the handle interior 972. The handle interior 972 can accommodate various components of the handle assembly 920, such as the inner housing 968 or portions of the locking mechanism 970, as non-exclusive examples. Additionally, the outer housing 963 can include an inner housing surface 974. In this embodiment, the inner housing surface 974 can include an outer housing tether receiver 976. The outer housing tether receiver 976 can be configured to receive the tether 14, i.e., to encircle or surround at least a portion of the tether 14, defining a path that guides or directs the tether 14 from the first housing aperture 966F (illustrated in FIG. 9B), through the handle interior 972 of the handle assembly 920, and to the second housing aperture 966S (illustrated in FIG. 9C). In other words, the outer housing tether receiver 976 can include any concave or curved configuration substantially similar to the dimensions or configuration of the tether 14. Alternatively, the configuration of the outer housing tether receiver 976 can vary. In various embodiments, the outer housing tether receiver 976 can also be configured to allow the tether 14 to slide or move within the handle interior 972.

Additionally, the outer housing tether receiver 976 can be configured to allow the tether 14 to slide or move within the handle interior 972. In the embodiment illustrated in FIG. 9D, the outer housing tether receiver 976 is positioned within the handle interior 972 and extends from at least a portion of the first outer housing end 965F (illustrated in FIG. 9B) to at least a portion of the second outer housing end 965S (illustrated in FIG. 9C). More specifically, the outer housing tether receiver 976 extends from the first housing aperture 966F to the second housing aperture 966S.

In the embodiment illustrated in FIG. 9D, the first outer housing member 964F can include a portion of the inner housing surface 974 and the second outer housing member 964S can also include a portion of the inner housing surface 974. In this embodiment, each portion of the inner housing surface 974 is substantially a mirror image of one another. Accordingly, both portions of the inner housing surface 974 can include at least a portion of the outer housing tether receiver 976, such that when the first outer housing member 964F and the second outer housing member 964S are coupled or connected, the outer housing tether receiver 976 may be formed. In FIG. 9D, while only the portion of the outer housing tether receiver 976 on the first outer housing member 964F is shown, it is understood that the portion of the outer housing tether receiver 976 on the second outer housing member 964S is substantially mirror image to the outer housing tether receiver 976 on the first outer housing member 964F.

The inner housing 968 can be configured to selectively interact with and/or selectively engage the tether 14. In various embodiments, the term "interact" as used with the inner housing 968 means to allow movement of the tether 14. Additionally, the term "engage" as used with the inner housing 968 can mean to slow and/or stop movement of the tether 14. Alternatively, the term "engage" as used with the inner housing 968 can mean to hold, fasten, clinch, secure, grip or lock on to the tether 14 to prevent movement of the tether 14 relative to handle assembly 920 in at least one direction. In various embodiments, the inner housing 968 can be configured to selectively engage the tether 14. In certain embodiments, the inner housing 968 can be configured to selectively engage the tether 14 when the handle assembly 920 is manipulated, i.e., by squeezing, pushing, sliding, pulling, etc. More specifically, when the handle assembly 920 is manipulated, the inner housing 968 can function to engage the tether 14 for the purpose of inhibiting the tether 14 from sliding or moving relative to the handle assembly 920 in at least one direction. Alternatively, the inner housing 968 may interact with the tether 14, to slow and/or allow the tether 14 to move within the handle interior 972.

The design of the inner housing 968 can vary. In certain embodiments, the inner housing 968 can include a somewhat curved configuration or shape, which may include a circular or elliptical configuration, as non-exclusive examples. In alternative embodiments, the inner housing 968 can include any other suitable configuration or geometry. Additionally, the inner housing 968 can be formed from any suitable material or materials, such as metal or metal alloy (stainless steel, titanium, aluminum, etc.), a composite material, wood, ceramic, or a relatively rigid plastic, as non-exclusive examples.

In the embodiment illustrated in FIG. 9D, the inner housing 968 can include a tether engager 977 and an inner housing tether receiver 978. It is understood that the inner housing 968 can include fewer or additional components than those specifically illustrated and described herein.

In some embodiments, the tether engager 977 can selectively engage the tether 14, such that the tether engager 977 may be coupled to, connected to and/or positioned on the inner housing 968 to aid with inhibiting the tether 14 from sliding or moving relative to the handle assembly 920 in at least one direction. In various embodiments, the term "engage" as used with the tether engager 977 can mean to slow and/or stop movement of the tether 14 in at least one direction. Alternatively, the term "engage" as used with the tether engager 977 can include to hold, fasten, clinch, secure, grip or lock on to the tether 14 to prevent movement of the tether 14 relative to the handle assembly 920 in at least one direction. The tether engager 977 may be coupled or connected to the inner housing 968 via any suitable manner or method. Furthermore, the tether engager 977 may be formed from any suitable material, such as rubber or other resilient materials, for example.

In certain embodiments, the inner housing tether receiver 978 can include a concave or curved design substantially similar to the dimensions or configuration of the tether 14 and/or the outer housing tether receiver 976, such that the inner housing tether receiver 978 can also partially serve to guide or direct the tether 14 within the handle interior 972. Accordingly, the outer housing tether receiver 976 and the inner housing tether receiver 978 can work in a somewhat complimentary fashion to at least partially surround the tether 14 to somewhat direct the tether 14 from the first housing aperture 966F, through the handle interior 972, and to the second housing aperture 966S. Additionally, with this configuration, the tether engager 977, the outer housing tether receiver 976 and the inner housing tether receiver 978 can somewhat operate together to control movement of the tether 14 within the handle interior 972.

In some embodiments, such as in FIG. 9D, the inner housing tether receiver 978 can be at least partially positioned on the perimeter of the inner housing 968. Alternatively, the inner housing tether receiver 978 can be positioned at any location on the inner housing 968.

It is understood that the inner housing 968 can selectively move between an unlocked position and a locked position. Although it is referred to herein that the inner housing 968 can move between the unlocked position and the locked position, it is recognized that the handle assembly 920 and other components of the handle assembly 920, can also move between the unlocked position and the locked position. As used herein, while the inner housing 968 is in the "locked position," the inner housing 968, including the tether engager 977, engages the tether 14 to inhibit the tether 14 from sliding or moving relative to the handle assembly 920 in at least one direction. More specifically, in the locked position, the tether engager 977, the outer housing tether receiver 976 and the inner housing tether receiver 978 can collectively function to prevent the tether 14 from sliding or moving relative to the handle assembly 920 in at least one direction. In other words, the handle assembly 920 is stationary or substantially immovable in at least one direction while in the locked position. In some embodiments, the inner housing 968 can be biased towards the locked position.

Contrarily, when the inner housing 968 is in the "unlocked position" the inner housing 968 interacts with and/or engages the tether 14, but does not inhibit movement of the tether 14 relative to the handle assembly 920. In other words, the inner housing, i.e., the tether engager 977, does not engage the tether 14 to prevent movement of the tether relative to the handle assembly 920. In the unlocked position, the tether 14 can slide or move within the handle interior 972. In certain embodiments, the inner housing 968 can be biased towards the unlocked position.

The locking mechanism 970 can be configured to move the inner housing 968 and/or the handle assembly 920 between the unlocked position and the locked position. The locking mechanism 970 can include an inner housing pivot 979, one or more pivot spacers 980A, 980B, a spring 982 and an inner housing mover 984. It is recognized that the locking mechanism 970 can include fewer or additional components than those specifically illustrated and described herein.

The inner housing pivot 979 and the pivot spacers 980A, 980B, are positioned within the handle interior 972. In some embodiments, the inner housing 968 can be positioned on the inner housing pivot 979, such that the inner housing 968 can rotate about the inner housing pivot 979. More specifically, in this embodiment, the inner housing 968 includes an aperture (not shown) through which the inner housing pivot 979 may enter, allowing the inner housing 968 to rotate about the inner housing pivot 979. Accordingly, the inner housing pivot 979 and aperture may include a substantially similar size, shape and/or design. Additionally, the inner housing pivot 979 can be formed from any suitable material or materials, such as stainless steel, as one non-exclusive example.

Additionally, in various embodiments, the pivot spacers 980A, 980B, can be configured to hold the inner housing pivot 979. For example, in this embodiment, the pivot spacers 980A, 980B, include an aperture (not shown) in which the inner housing pivot 979 may be placed and held. Accordingly, the inner housing pivot 979 and aperture may include a substantially similar size, shape and/or design. Additionally, in this embodiment, the outer housing 963 can include a spacer cavity 985 on the inner housing surface 974, wherein the pivot spacers 980 may be securely placed and/or held. The pivot spacers 980A, 980B, can be formed from any suitable material or materials, such as a nylon or other composite materials, as non-exclusive examples. It is understood that while two pivot spacers 980A, 980B, are illustrated herein, the locking mechanism 970 can include any number of pivot spacers 980A, 980B, i.e., one, two, three, etc.

The spring 982 is positioned within the handle interior 972. More specifically, the spring 982 is positioned between the inner housing 968 and the inner housing surface 974. Additionally, in certain embodiments, such as the embodiment illustrated in FIG. 9D, the spring 982 may be at least partially positioned to surround or encircle the pivot spacer 980A, 980B. Alternatively, the spring 982 may be at least partially positioned to surround or encircle the inner housing pivot 979. Furthermore, in some embodiments, the spring 982 can be coupled or connected to the inner housing 968, such that as the inner housing 968 is moved between the unlocked and locked positions, the spring 982 can compress and expand. In certain embodiments, the spring 982 can be biased in the unlocked position or the locked position.

The inner housing mover 984 is secured or connected to the inner housing 968 and may be manipulated by the user, by squeezing, pushing, sliding, pulling, or any other suitable manner. In the embodiment illustrated in FIG. 9D, the inner housing mover 984 includes a slidable element, wherein the inner housing mover 984 can be manipulated or selectively slid to discrete positions within a slot 986 to move the inner housing 968 between the unlocked position and the locked position. Alternatively, the inner housing mover 984 can be manipulated or selectively slid to discrete positions within the slot 986 to adjust the inner housing 968 to allow the handle assembly 920 to move along the tether 14. Still alternatively, the inner housing mover 984 can be selectively slid to discrete positions within the slot 986 as the user moves and/or slides the handle assembly 920 in certain directions along the tether 14. In certain embodiments, the outer housing 963 can include the slot 986. More specifically, in FIG. 9D, both the first outer housing member 964F and the second outer housing member 964S can each include at least a portion of the slot 986, such that when the first outer housing member 964F and the second outer housing member 964S are coupled or connected, the slot 986 can be formed.

In various embodiments, the inner housing mover 984 can include other suitable designs. In such embodiments, the inner housing mover 984 can be manipulated, i.e., moved, depressed, slid, etc., in order to move the inner housing 968 between the unlocked and locked positions. For example, in one such embodiment, the inner housing mover 984 can include a switch, wherein the inner housing mover 984 can be selectively moved to discrete positions within the slot 986 to move the inner housing 968 between the unlocked and locked positions. Similarly, the inner housing mover 984 can include a lever that can be selectively moved to discrete positions within the slot 986 to move the inner housing 968 between the unlocked and locked positions. Alternatively, the inner housing mover 984 can include a button that is coupled to the inner housing 968. In such embodiment, depressing the button can move the inner housing 968 between the unlocked and locked positions.

FIG. 10A is a perspective view of still another embodiment of the handle assembly 1020. In the embodiment illustrated in FIG. 10A, the handle assembly 1020 is shown in the unlocked position. In this embodiment, the handle assembly 1020 is also coupled to the tether 1014.

FIG. 10B is a cross-sectional view of the handle assembly 1020 taken on line 10B-10B in FIG. 10A. In this embodiment, the inner housing mover 1084 is secured or connected to the inner housing 1068. Accordingly, in certain embodiments, the inner housing 1068 and/or the inner housing mover 1084 can move between the unlocked position and the locked position.

For example, when the inner housing 1068 and/or the inner housing mover 1084 are moved in a first direction of arrow 1088 (sometimes referred to herein as "first direction"), the inner housing 1068 is selectively maintained in the unlocked position. Alternatively, when the when the inner housing 1068 and/or the inner housing mover 1084 are moved in a second direction of arrow 1090 (sometimes referred to herein as "second direction") that is substantially opposite the first direction 1088, the inner housing 1068 is selectively maintained in the locked position. It is understood that while the terms "first direction 1088" and "second direction 1090" are interchangeable, the first direction 1088 and the second direction 1090 are substantially opposite of one another.

When in the unlocked position, as illustrated in FIG. 10B, the inner housing 1068 may interact with or engage the tether 1014. However, while in the unlocked position, the inner housing 1068 does not inhibit movement of the tether 1014 relative to the handle assembly 1020 in either the first direction 1088 or the second direction 1090. Accordingly, the tether 1014 can slide or move within the handle interior 1072 in either the first direction 1088 or the second direction 1090 while in the unlocked position.

In FIG. 10B, the tether 1014 can enter either housing aperture 1066F, 1066S, extend through the handle interior 1072 and exit either housing aperture 1066F, 1066S. More specifically, while within the handle interior 1072, the outer housing tether receiver 1076 and the inner housing tether receiver 1078 can receive the tether 1014 and may be configured to collectively position, guide or direct the tether 1014 from the first housing aperture 1066F to the second housing aperture 1066S. In this embodiment, the outer housing tether receiver 1076 and/or the inner housing tether receiver 1078 have a curved configuration. As used herein, "curved configuration" can include any configuration that positions and/or guides the tether 1014 through the handle interior 1072 in a substantially non-linear, curved, bent, rounded or not straight manner. In an alternative embodiment, the outer housing tether receiver 1076 and/or the inner housing tether receiver 1078 can have a linear configuration. As used herein, "linear configuration" can include any configuration that positions and/or guides the tether 1014 through the handle interior in a substantially straight, not curved or not rounded manner.

In certain embodiments, the inner housing 1068 can be biased towards the unlocked position. In other words, the spring 982 (illustrated in FIG. 9D) can be biased to maintain the inner housing 1068 and/or the handle assembly 1020 in the unlocked position when the spring 982 is resting. For example, in various embodiments, the spring 982 can be coupled, connected or engaged with at least a portion of the inner housing 1068. When the spring 982 is resting, the inner housing 1068 can be biased in the first direction 1088. Furthermore, the inner housing mover 1084 that is secured or connected to the inner housing 1068 can also be biased in the first direction 1088, which can selectively maintain the inner housing 1068 in the unlocked position.

In one embodiment, the inner housing 1068 can move between the unlocked position and the locked position as the inner housing mover 1084 is manipulated. In certain embodiments, where the inner housing 1068 is biased in the unlocked position, the inner housing 1068 may remain in the unlocked position unless the inner housing mover 1084 is manipulated. For example, when the inner housing mover 1084 is manipulated, i.e., moved in a second direction 1090, the spring 982 can be compressed. As the inner housing mover 1084 is manipulated to compress the spring 982, the inner housing 1068 can also rotate or move in the second direction 1090. Movement of the inner housing mover 1084 in the second direction 1090 can simultaneously cause the inner housing 1068 to rotate and/or move from the unlocked position to the locked position. More specifically, movement of inner housing mover 1084 can cause the inner housing 1068 to rotate in substantially the same second direction 1090 in order to rotate and/or move the inner housing 1068 from the unlocked position and to the locked position. Alternatively, the inner housing 1068 can move between the unlocked position and the locked position as the handle assembly 1020 is slid or moved along the tether 1014.

FIG. 11A is a perspective view of another embodiment of the handle assembly 1120. In the embodiment illustrated in FIG. 11A, the handle assembly 1120 is in the locked position. In this embodiment, the handle assembly 1120 is also coupled to the tether 1114.

FIG. 11B is a cross-sectional view of the handle assembly 1120 taken on line 11B-11B in FIG. 11A. In this embodiment, the inner housing mover 1184 is secured or connected to the inner housing 1168. Accordingly, in certain embodiments, the inner housing 1168 and/or the inner housing mover 1184 can move between the unlocked position and the locked position.

In various embodiments, when in the locked position, the inner housing 1168, including the tether engager 1177, engages the tether 1114 to inhibit the tether 1114 from sliding or moving in the first direction 1188 within the handle interior 1172. For example, with the configuration of the inner housing 1168 in the locked position, as illustrated in FIG. 11B, the tether engager 1177 functions to stop or inhibit the tether 1114 from sliding or moving relative to the handle assembly 1120 in the first direction 1188, while allowing movement of the tether 1114 relative to the handle assembly 1120 in the second direction 1190. More specifically, with this configuration, the inner housing 1168, the tether engager 1177, the outer housing tether receiver 1176 and the inner housing tether receiver 1178 can somewhat operate together to control movement of the tether 1114 within the handle interior 1172. For example, this configuration can function to create more friction in one direction than the other. Alternatively, the configuration of the inner housing 1168 in the locked position can vary. Additionally, and/or in the alternative, when in the locked position, the inner housing 1168, including the tether engager 1177, can engage the tether 1114 to inhibit the tether 1114 from sliding or moving relative to the handle assembly 1120 in any direction, including the first direction 1188 and the second direction 1190.

In FIG. 11B, the tether 1114 can enter either housing aperture 1166F, 1166S, extend through the handle interior 1172 and exit either housing aperture 1166F, 1166S. More specifically, while within the handle interior 1172, the outer housing tether receiver 1176 and the inner housing tether receiver 1178 can receive the tether 1114 and/or may be configured to collectively position, guide or direct the tether 1114 from the first housing aperture 1166F to the second housing aperture 1166S.

In certain embodiments, the inner housing 1168 can be biased towards the locked position. In other words, the spring 982 (illustrated in FIG. 9D) can be biased to maintain the inner housing 1168 and/or the handle assembly 1120 in the locked position when the spring 982 is resting. For example, in various embodiments, the spring 982 can be coupled, connected or engaged with at least a portion of the inner housing 1168. When the spring 982 is resting, the inner housing 1168 can be biased in the second direction 1190. Furthermore, the inner housing mover 1184 that is secured or connected to the inner housing 1168 can also be biased in the second direction 1190, which can selectively maintain the inner housing 1168 in the locked position.

In one embodiment, the inner housing 1168 can move between the locked position and the unlocked position as the inner housing mover 1184 is manipulated. In certain embodiments, where the inner housing 1168 is biased in the locked position, the inner housing 1168 may remain in the locked position unless the inner housing mover 1184 is manipulated. For example, when the inner housing mover 1184 is manipulated, i.e., moved in the first direction 1188, the spring 982 can be compressed. As the inner housing mover 1184 is manipulated to compress the spring 982, the inner housing 1168 can also rotate or move in the first direction 1188. Movement of the inner housing mover 1184 in the first direction 1188 can simultaneously cause the inner housing 1168 to rotate and/or move from the locked position to the unlocked position. More specifically, movement of inner housing mover 1184 can cause the inner housing 1168 to rotate and/or move relative to the inner housing pivot 1178 in substantially the same first direction 1188 in order to rotate and/or move the inner housing 1168 from the locked position and to the unlocked position. Alternatively, the inner housing 1168 can move between the locked position and the unlocked position as the handle assembly 1120 is slid or moved along the tether 1114.

Figure 12A:
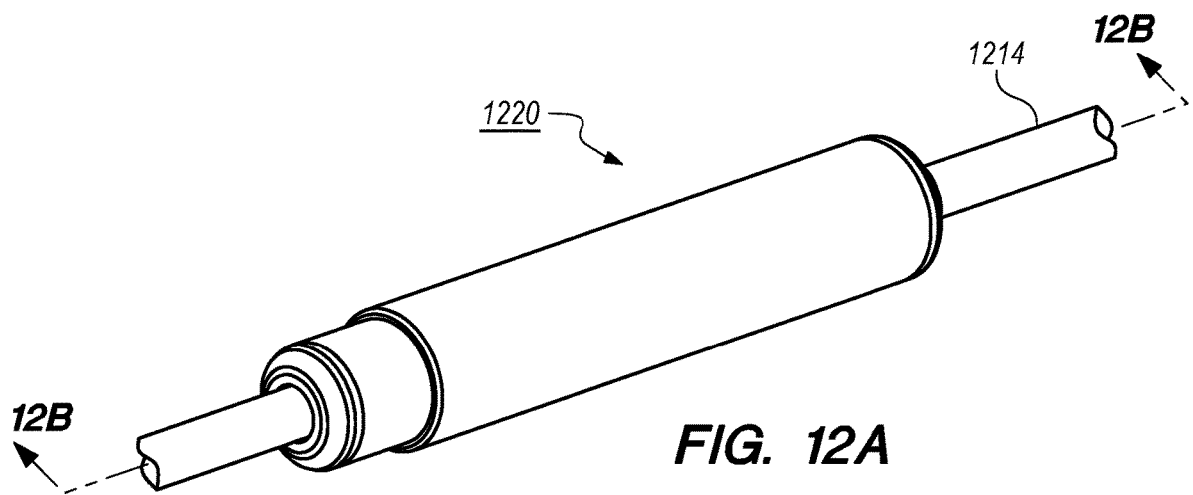
FIG. 12A is a perspective view of yet another embodiment of the handle assembly.

FIG. 12A is a perspective view of another embodiment of the handle assembly 1220. In certain embodiments, such as the embodiment in FIG. 12A, the handle assembly 1220 can have a somewhat cylindrical shape or configuration. In this embodiment, the handle assembly 1220 is also coupled to the tether 1214.

Figure 12B:
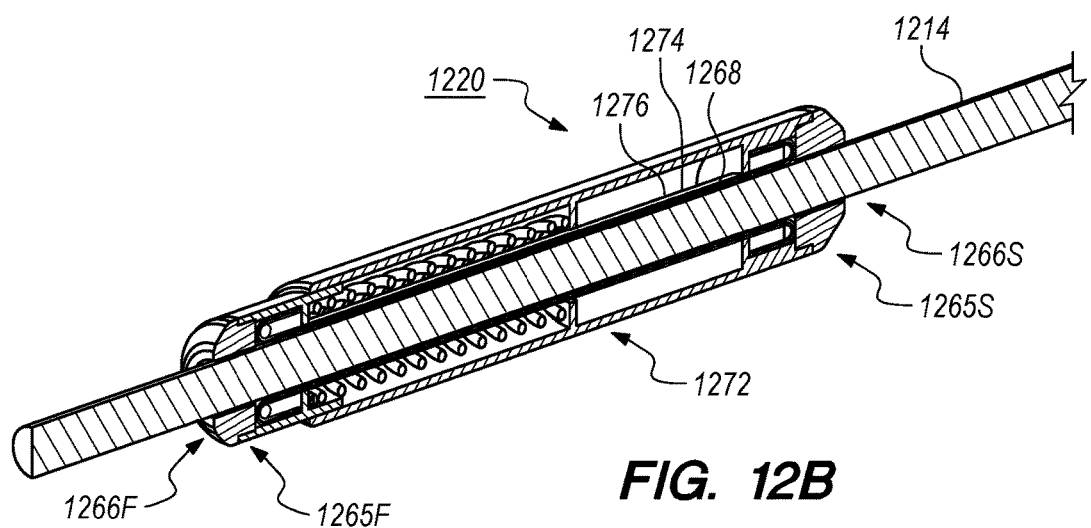
FIG. 12B is a cross-sectional view of the handle assembly taken on line 12B-12B in FIG. 12A.

FIG. 12B is a cross-sectional view of the embodiment of the handle assembly 1220 in FIG. 12A taken on line 12B-12B. In FIG. 12B, the handle assembly 1220 can include the first housing aperture 1266F on the first outer housing end 1265F, the second housing aperture 1266S on the second outer housing end 1265S, the inner housing 1268 and the outer housing tether receiver 1276, all of which can somewhat collectively function or operate to allow the tether 1214 to pass through the handle interior 1272 of the handle assembly 1220.

The first housing aperture 1266F on the first outer housing end 1265F and the second housing aperture 1266S on the second outer housing end 1265S can allow the tether 1214 to enter and exit the handle interior 1272. In other words, the first housing aperture 1266F and the second housing aperture 1266S can be configured to allow the tether 1214 to slide onto either end of the tether 1214, e.g., first tether end 24F (illustrated in FIG. 1) or the second tether end 24S (illustrated in FIG. 1). The first housing aperture 1266F and the second housing aperture 1266S can include a diameter or any other dimension substantially similar to the tether 1214. Further, the size, shape and/or design of the first housing aperture 1266F and the second housing aperture 1266S can vary depending on the design and/or shape of the tether 1214.

In one non-exclusive embodiment, the inner housing 1268 can include a lumen that at least partially and/or substantially encircles the tether 1214 within the handle interior 1272. Accordingly, the inner housing 1268 can include a diameter or any other dimension substantially similar to the tether 1214. In this embodiment, the inner housing 1268 extends from at least a portion of the first outer housing end 1265F to at least a portion of the second outer housing end 1265S. Additionally, the inner housing 1268, i.e., lumen, can be formed from any suitable material, which may include a plastic, nylon or carbon fiber, as non-exclusive examples.

In the embodiment illustrated in FIG. 12B, the outer housing tether receiver 1276 can be configured to at least partially and/or substantially encircle or surround at least a portion of the tether 1214 and/or to position, guide or direct the tether 1214 from the first housing aperture 1266F, through the handle interior 1272 of the handle assembly 1220, and to the second housing aperture 1266S. In this embodiment, the outer housing tether receiver 1276 has the linear configuration. More specifically, the outer housing tether receiver 1276 includes a linear lumen that at least partially encircles or surrounds the inner housing 1268. In the embodiment illustrated in FIG. 12B, the outer housing tether receiver 1276 is positioned on the inner housing surface 1274 and within the handle interior 1272. The outer housing tether receiver 1276 also extends from at least a portion of the first outer housing end 1265F to at least a portion of the second outer housing end 1265S.

Additionally, the handle assembly 1220 and/or the inner housing 1268 can be configured to interact with and/or engage the tether 1214. For example, in certain embodiments, the inner housing 1268 can be formed from a relatively flexible material such that the inner housing 1268 can engage the tether 1214. In some embodiments, the inner housing 1268 can engage the tether 1214 when the handle assembly 1220 is manipulated, i.e., by squeezing, pushing, sliding, pulling, etc. More specifically, in one embodiment, when the handle assembly 1220 is manipulated, the inner housing 1268 can create friction with the tether 1214 for the purpose of inhibiting the tether 1214 from slipping or moving relative to the handle assembly 1220. In another embodiment, when the handle assembly 1220 is manipulated, the inner housing 1268 can be placed in tension against the tether 1214 for the purpose of inhibiting the tether 1214 from slipping or moving relative to the handle assembly 1220 (i.e., in a manner similar to the function of a "Chinese finger trap"). Alternatively, the handle assembly 1220 can be manipulated to inhibit the tether 1214 from slipping or moving relative to the handle assembly 1220 via any suitable manner. Furthermore, in various embodiments, the tether 1214 can slide or move within the handle interior 1272.

In one embodiment, the handle assembly 1220 can remain static or stationary. For example, the handle assembly 1220 can be used in conjunction with other components of the leash system 10, such as the latch assemblies 18F, 18S (illustrated in FIG. 1), in a fashion similar to a handle, such as a water ski handle, for example.

It is understood that this disclosure further includes any method for manufacturing the different embodiments of the handle assembly of the leash system mentioned and/or described herein.

It is further understood that although a number of different embodiments of the leash system have been illustrated and described herein, one or more features of any one embodiment can be combined with one or more features of one or more of the other embodiments, provided that such combination satisfies the intent of the present invention.

While a number of exemplary aspects and embodiments of the leash system have been shown and disclosed herein above, those of skill in the art will recognize certain modifications, permutations, additions and sub-combinations thereof. It is therefore intended that the consumable shall be interpreted to include all such modifications, permutations, additions and sub-combinations as are within their true spirit and scope, and no limitations are intended to the details of construction or design herein shown.

What is claimed is:

1. A handle assembly for a leash system, the leash system including a tether, the handle assembly comprising:
    an outer housing that defines a handle interior;
    an inner housing positioned within the handle interior, the inner housing selectively moving between an unlocked position and a locked position, wherein in the locked position the inner housing inhibits movement of the tether relative to the handle assembly in a first direction and does not inhibit movement of the tether relative to the handle assembly in a second direction that is substantially opposite the first direction; and an inner housing mover that is connected to the inner housing, the inner housing mover selectively moving the inner housing between the unlocked position and the locked position, the inner housing mover including one of a slidable element, a switch, a lever and a button.

2. A handle assembly for a leash system, the leash system including a tether, the handle assembly comprising:
an outer housing that defines a handle interior, the outer housing having one of a substantially spherical and a substantially cylindrical configuration; and
an inner housing positioned within the handle interior, the inner housing selectively moving between an unlocked position and a locked position, wherein in the locked position the inner housing inhibits movement of the tether relative to the handle assembly in a first direction and does not inhibit movement of the tether relative to the handle assembly in a second direction that is substantially opposite the first direction.

3. The handle assembly of claim 2 further comprising an inner housing mover that is connected to the inner housing, the inner housing mover selectively moving the inner housing between the unlocked position and the locked position.

4. The handle assembly of claim 3 wherein the inner housing mover includes one of a slidable element, a switch, a lever and a button.

5. The handle assembly of claim 2 wherein the inner housing is biased towards one of the unlocked position and the locked position.

6. A handle assembly for a leash system, the leash system including a tether, the handle assembly comprising:
an outer housing that defines a handle interior, the outer housing including a first outer housing member and an opposed second outer housing member that is connected to the first outer housing member; and
an inner housing positioned within the handle interior, the inner housing selectively moving between an unlocked position and a locked position, wherein in the locked position the inner housing inhibits movement of the tether relative to the handle assembly in a first direction and does not inhibit movement of the tether relative to the handle assembly in a second direction that is substantially opposite the first direction.

7. The handle assembly of claim 6 wherein the outer housing has a substantially spherical configuration.

8. The handle assembly of claim 6 wherein the first outer housing member and the second outer housing member are substantially mirror images of one another.

9. The handle assembly of claim 6 wherein the outer housing includes an outer housing tether receiver that receives the tether.

10. The handle assembly of claim 9 wherein the outer housing tether receiver is configured to position the tether in a substantially curved configuration within the handle interior.

11. The handle assembly of claim 9 wherein the outer housing tether receiver is configured to position the tether in a substantially linear configuration within the handle interior.

12. The handle assembly of claim 6 wherein the inner housing includes a tether engager that selectively engages the tether to inhibit movement of the tether relative to the handle assembly in the first direction.

13. The handle assembly of claim 12 wherein the tether engager is formed from a resilient material.

14. The handle assembly of claim 6 wherein the inner housing is biased towards one of the unlocked position and the locked position.

15. The handle assembly of claim 6 further comprising an inner housing pivot, wherein the inner housing rotates about the inner housing pivot.

16. The handle assembly of claim 6 wherein the outer housing of the handle assembly is substantially cylindrical.

17. A handle assembly for a leash system, the leash system including a tether, the handle assembly comprising:
an outer housing that defines a handle interior, the outer housing including an outer housing tether receiver that receives the tether, the outer housing tether receiver being configured to position the tether in a substantially linear configuration within the handle interior; and
an inner housing positioned within the handle interior, the inner housing selectively moving between an unlocked position and a locked position, wherein in the locked position the inner housing inhibits movement of the tether relative to the handle assembly in a first direction and does not inhibit movement of the tether relative to the handle assembly in a second direction that is substantially opposite the first direction.

18. A handle assembly for a leash system, the leash system including a tether, the handle assembly comprising:
an outer housing that defines a handle interior, the inner housing including a tether engager that is formed from a resilient material, the tether engager being configured to selectively engage the tether to inhibit movement of the tether relative to the handle assembly in a first direction; and
an inner housing positioned within the handle interior, the inner housing selectively moving between an unlocked position and a locked position, wherein in the locked position the inner housing inhibits movement of the tether relative to the handle assembly in the first direction and does not inhibit movement of the tether relative to the handle assembly in a second direction that is substantially opposite the first direction.

19. The handle assembly of claim 18 wherein the outer housing includes a first outer housing member and an opposed second outer housing member that is connected to the first outer housing member.

20. The handle assembly of claim 18 wherein the inner housing is biased towards one of the unlocked position and the locked position.

* * * * *